April 9, 1968     E. J. ALTHAUS ETAL     3,377,471
SYSTEM EFFECTIVENESS SIMULATOR AND COMPUTER
Filed July 21, 1964     18 Sheets-Sheet 1
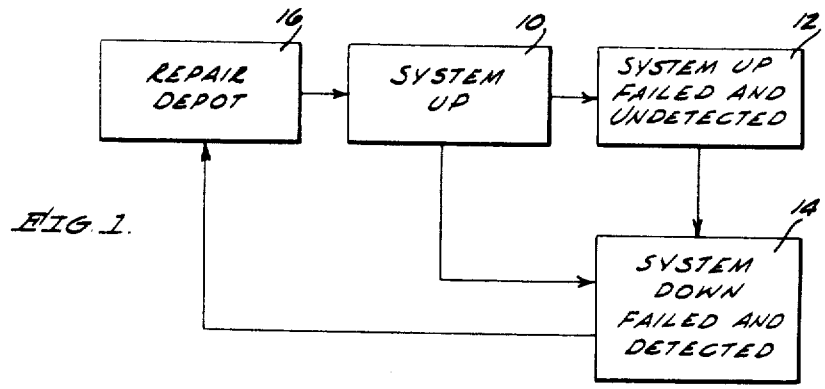
*FIG. 1.*
| STATE | SIMULATED CONDITION | DISPLAY | $X_n$ | $Y_n$ |
|---|---|---|---|---|
| 1 | IN OPERATION | GREEN LIGHT | 0 | 0 |
| 2 | UNDETECTED FAILURE | RED LIGHT | 0 | 1 |
| 3 | DETECTED FAILURE | ALERT - ALL LIGHTS OFF | 1 | 0 |
| 4 | REPAIR | YELLOW LIGHT | 1 | 1 |
*FIG. 2.*
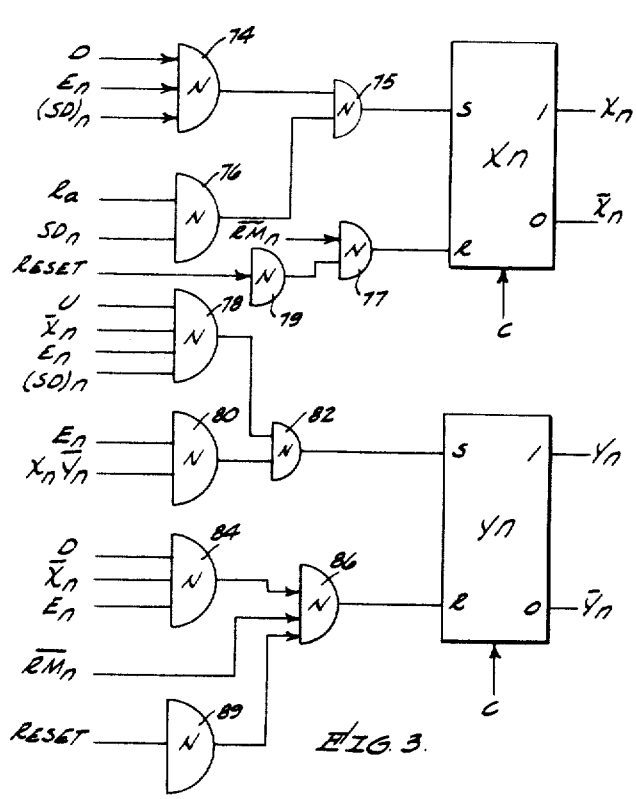
*FIG. 3.*
INVENTORS.
EDWARD J. ALTHAUS,
EDWARD P. ANDERT,
ERNEST M. RICHTER,
BY Walter J. Adam
ATTORNEY.

April 9, 1968    E. J. ALTHAUS ETAL    3,377,471
SYSTEM EFFECTIVENESS SIMULATOR AND COMPUTER
Filed July 21, 1964

April 9, 1968     E. J. ALTHAUS ETAL     3,377,471
SYSTEM EFFECTIVENESS SIMULATOR AND COMPUTER
Filed July 21, 1964     18 Sheets-Sheet 4
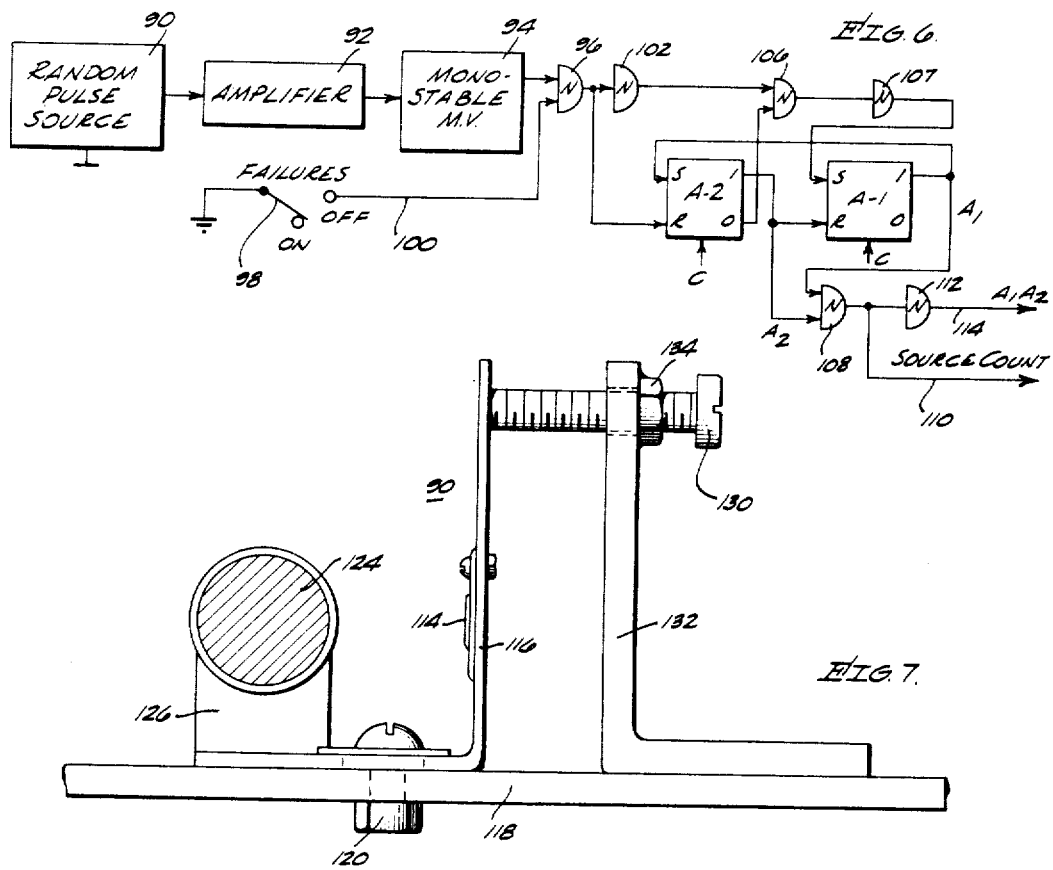
FIG. 6.
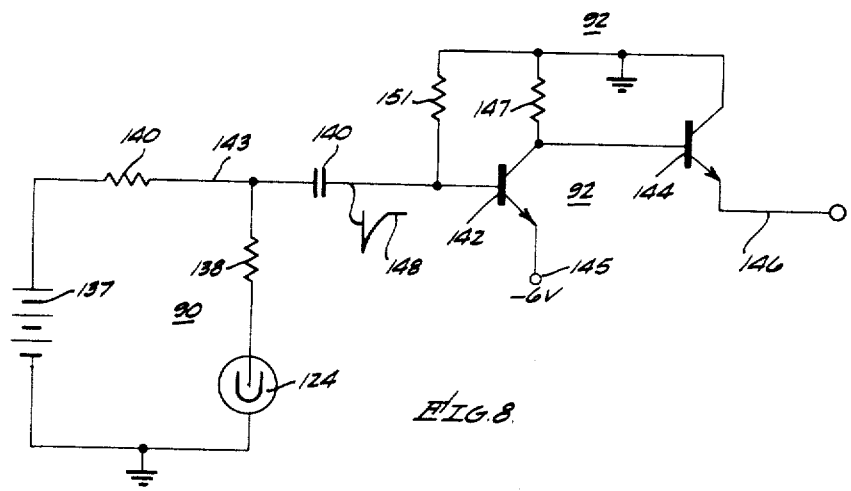
FIG. 7.
FIG. 8.

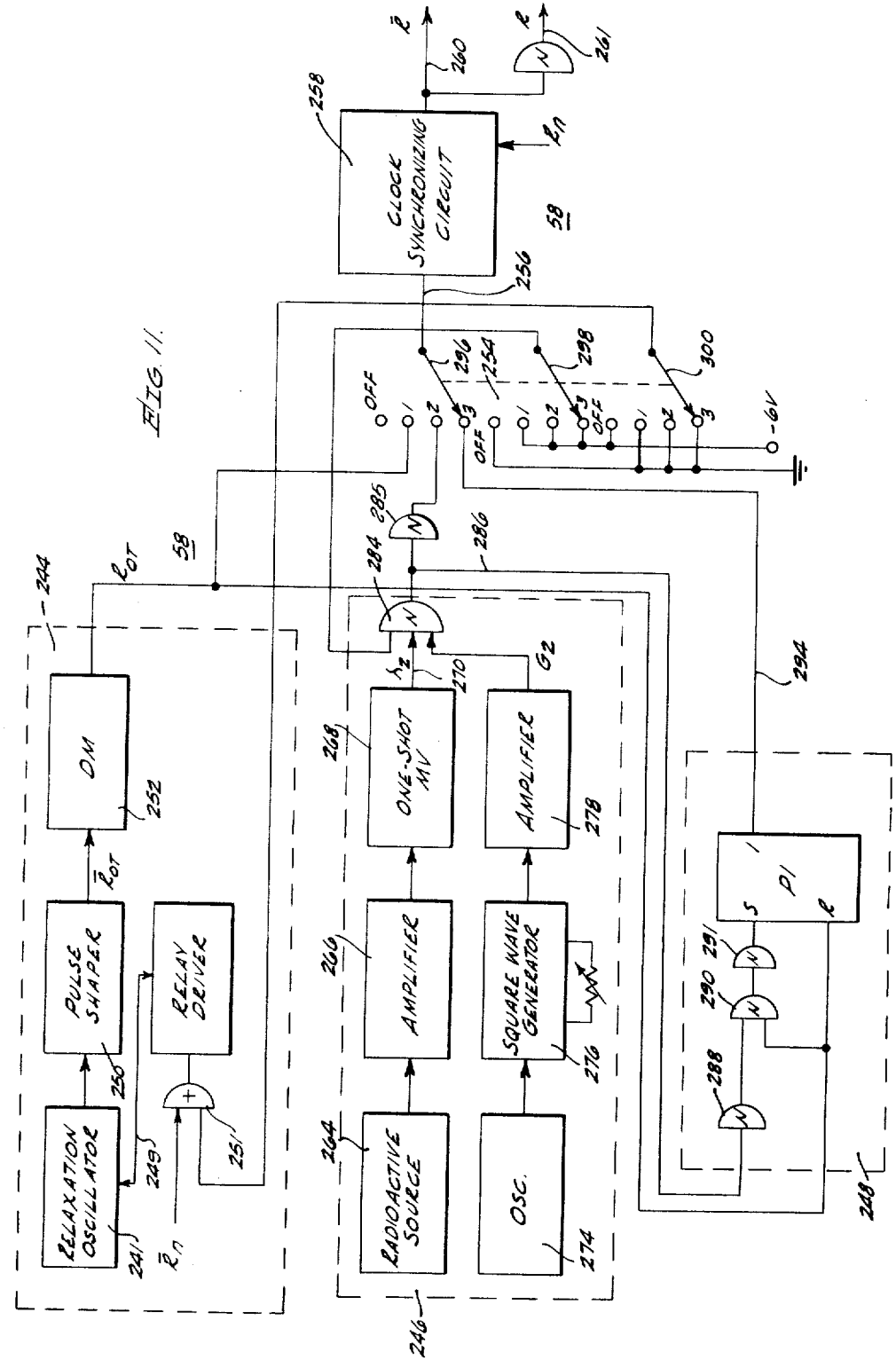

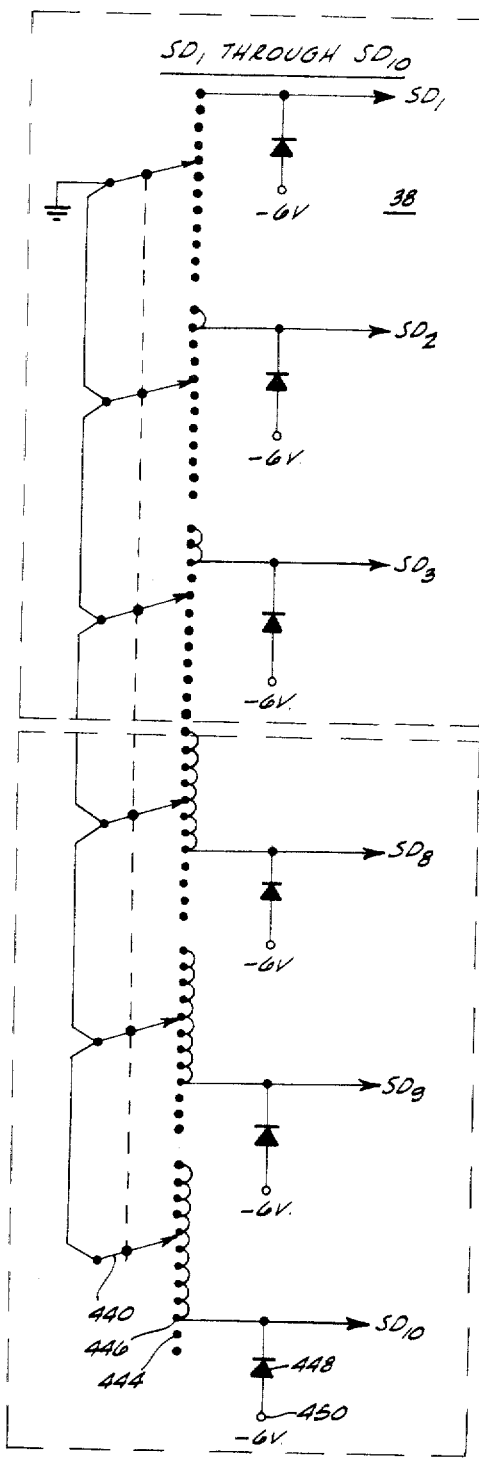
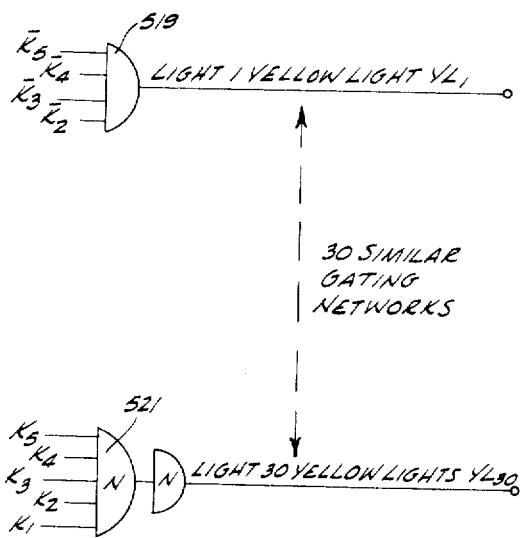
FIG. 18.
FIG. 20.
FIG. 21.

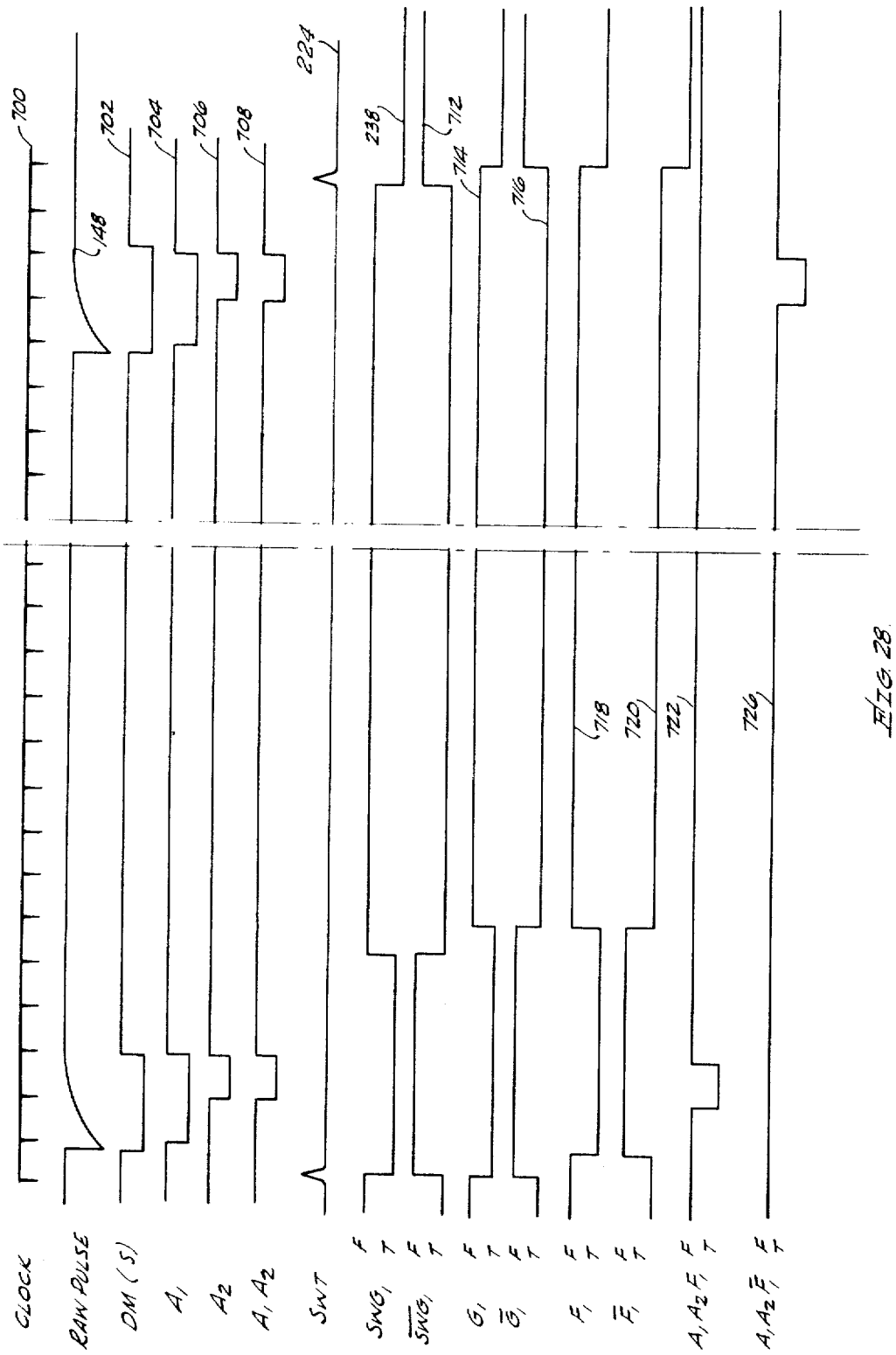

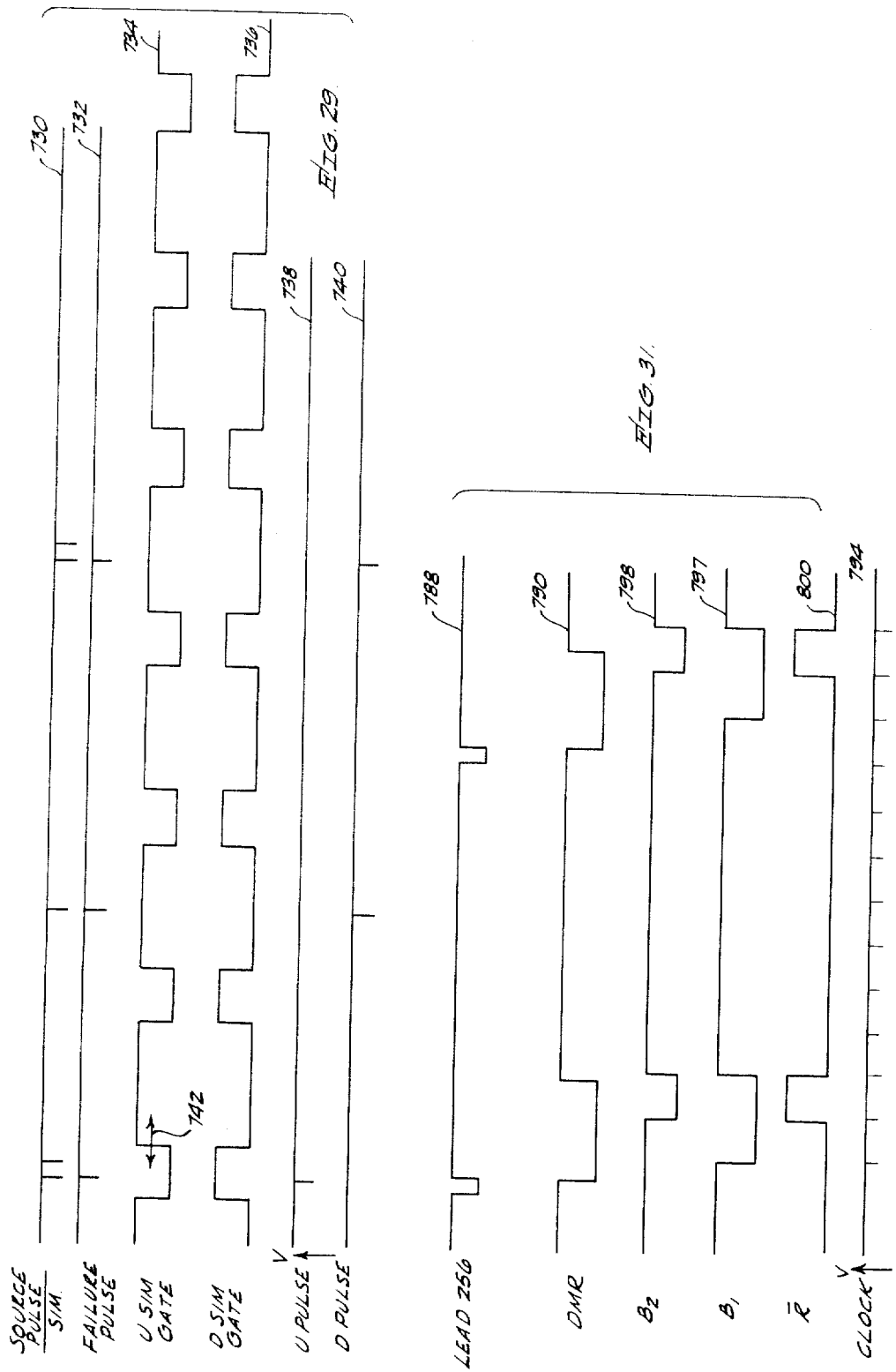

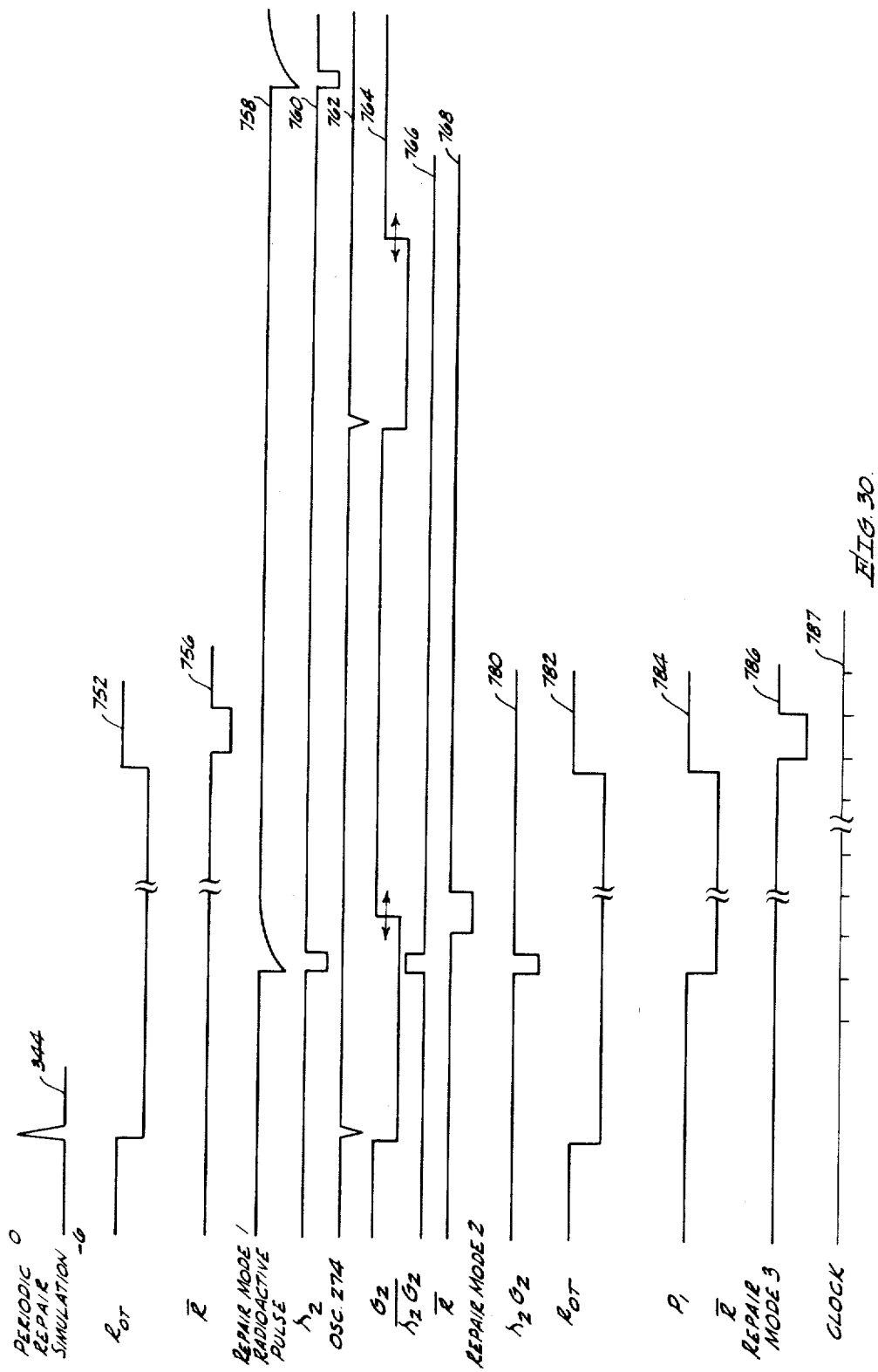

United States Patent Office 3,377,471
Patented Apr. 9, 1968

3,377,471
SYSTEM EFFECTIVENESS SIMULATOR
AND COMPUTER
Edward J. Althaus, Playa Del Rey, Edward P. Andert,
Anaheim, and Ernest M. Richter, Fullerton, Calif., assignors to Hughes Aircraft Company, Culver City,
Calif., a corporation of Delaware
Filed July 21, 1964, Ser. No. 384,176
13 Claims. (Cl. 235—152)

This invention relates generally to devices for demonstration and analyzing the time related and population size related properties of populations of entities subject to stochastic transformations from one state to another, and also the statistical behavior of queues or waiting lines. This invention relates particularly to a reliability simulator for accurately relating variable statistical reliability and maintainability quantities to system effectiveness and availability.

In units such as specific electronic equipment, devices or systems, the interactions between logistic and maintenance operations and reliability of the equipment provides problems which must be solved in order to determine parameters such as replacement rates, checkout efficiency and mission effectiveness or success probability. For example, in a population of systems, which may be aircraft, spacecraft, missiles or submarines, it is desirable to know the effectiveness or the availability of units which are subject to the incidence of both detected and undetected failures with repairs being continuously or periodically performed on failed systems. Frequently, statistical reliability and maintainability problems have been solved by mathematical manipulations programmed in a digital computer using tabulated random or otherwise distributed numbers. However, the necessity of providing a problematical expression for digital computers which faithfully represents the stochastic process and the need for controlling distribution values are factors that can be avoided by a device such as here described which instead of utilizing formulas, incorporates the actual occurrence of random events. Examples of statistical problems that are difficult to solve on conventional computers or analytically are those that include non-steady processes, such as during population growth, breakdown of the repair depot and the occurrence of simultaneous events. Also, all the computer results are not often available for continuous visible monitoring which may be desirable where population conditions are to be studied by trial and error insertion of initial or intermediate conditions, for example.

Some types of probability problems are solved as a function of a Poisson exponential distribution and some as a function of a geometric distribution in which a random event must happen, if the event occurs, at the end of a fixed interval of time. For example, repair events may occur either at fixed intervals, with a Poisson random distribution or with a geometric distribution. A simulator that would provide selection of sources of events of either fixed occurrences or of a desired type of random occurrence or of a desired type of random occurrence would be highly desirable and useful in the art.

It is therefore an object of this invention to provide a machine operable to perform a highly representative reliability simulation.

It is a further object of this invention to provide a system relating statistical theory to visible hardware for rapidly solving statistical problems in a manner that provides a hitherto unavailable verification of mathematical simulation through the action of actual statistical procedures.

It is a still further object of this invention to provide a system that solves problems of system or unit availability and reliability with an improved and simplified arrangement for developing random events.

It is another object of this invention to provide a stochastic simulator in which the results of continuous probability determinations may be continuously monitored and observed.

It is still another object of this invention to provide a statistical reliability simulator system in which populatons may be varied and in which at least one of the sources of events may be selected to provide desired distributions of the occurrence of events.

It is another object of this invention to provide a reliability simulator system having sources of random events that are controllable to provide variable average rates of occurrence.

It is another object of this invention to provide a reliability simu'ator having a system time scale that is readily related to real time and in which a variable system time scale is provided.

It is another object of this invention to provide a system for forming waiting queues.

Briefly, the reliability and maintainability simulator in accordance with the principles of the invention may simulate the conditions of a complex of systems with a population of up to 30 systems, for example. The number of elements in the population is only limited by physical size of the machine. Each element which simulates a system is subjected to random failures which may remain undetected or detected as a function of the specific capabilities of the checkout equipment being simulated. Failure events are produced by random pulses generated by a radioactive source to provide a random or Poisson distribution of pulse in time. Each system is maintained or repaired at a single repair depot and the system element enters the repair depot upon the occurrence of a detectable failure. The repair rates and failure rates may be adjustable for any simulated complex of systems but is fixed for each system element and identical at the rate selected for the complex of systems.

The source of repair pulses may be a random or Poisson distribution pulse source, a source providing a geometric distribution (repair at the end of fixed intervals) or a fixed repair rate. Undetected failures in any system are identified by a display device but do not cause the initiation of a maintenance period. The simulator system provides displays for visual demonstrations of the population in operable condition, in a failed but undetected condition and in the repair or waiting condition. The average failure rate is variable for selecting favorable time parameters relative to real time. The average repair rate is adjustable over a wide range during either random repair or repair after fixed intervals.

Each system element is simulated by two flip flops having states 1 through 4 simulating four system element conditions which are respectively normal operate, undetected failure, detected failure and repair. An element is normally in the operate condition and remains in that state until a random failure pulse changes the element to either states 2 or 3 (undetected or detected failures). The percent of detected failures over the undetected failures is variable over a wide range for the system complex. System elements are turned in for repair upon occurrence of a detected failure state in response to sequentially sampling of each element with the output signal of a first ring counter. When a system or a plurality of systems have a detectable failure or are in the repair depot, an identified system responds to generation of repair pulses. A second shift register is provided to identify a system in repair or having a detected failure and hold until that particular system element is repaired and changed to state 1. Systems in repair lose their identity and may be repaired out of the order in which they entered but provide an average repair time. A bidirectional counter maintains a count of the number of elements in repair and controls yellow indicator lights displaying a waiting queue of elements in repair. Green and red indicator lights respectively representing specific elements in operate and undetected failure states are provided to provide a continuous display of the changing results of probability problems.

The novel features of this invention, as well as the invention itself, both as to its organization and method of operation, will best be understood from the accompanying description taken in connection with the accompanying drawings in which like characters refer to like parts, and in which:

FIG. 1 is a schematic block diagram showing the overall functional operation of the system in accordance with the invention;

FIG. 3 is a schematic block and circuit diagram of a typical simulated system element utilized in the simulator system of FIG. 2;

FIG. 4 is a table showing the states of the two flip flops utilized in the system elements such as the typical system element of FIG. 3;

FIG. 6 is a schematic circuit and block diagram of the random or Poisson pulse source utilized as the failure pulse generator of FIG. 2;

FIG. 7 is an elevation view of the adjustable rate radioactive source utilized in the random pulse source of FIG. 6;

FIG. 8 is a schematic circuit diagram for further explaining the pulse source of FIG. 6;

FIG. 11 is a schematic block and circuit diagram of the repair pulse source utilized in the reliability simulator of FIG. 2;

FIG. 18 is a schematic circuit diagram of a portion of the system element population control switch that may be utilized in the simulator of FIG. 2;

FIG. 20 is a table for explaining the control of the yellow repair lights by the bidirectional counter in the system of FIG. 2;

FIG. 21 is a schematic circuit and block diagram of the display logic for the green and red indicator lights utilized in the system of FIG. 2;

FIG. 28 is a schematic diagram of voltage waveforms as a function of time for further explaining the failure pulse generator utilized in the simulator of FIG. 2;

FIG. 29 is a schematic diagram of additional voltage waveforms as a function of time for explaining the operation of the failure pulse generator of FIG. 2;

FIG. 30 is a schematic diagram of waveforms for explaining the operation of the three selectable sources of repair pulses utilized in the source of repair pulses of FIG. 2; and FIG. 31 is a schematic diagram of voltage waveforms as a function of time for explaining the operation of the repair pulse synchronizing circuit of FIG. 12.

Figure 2:
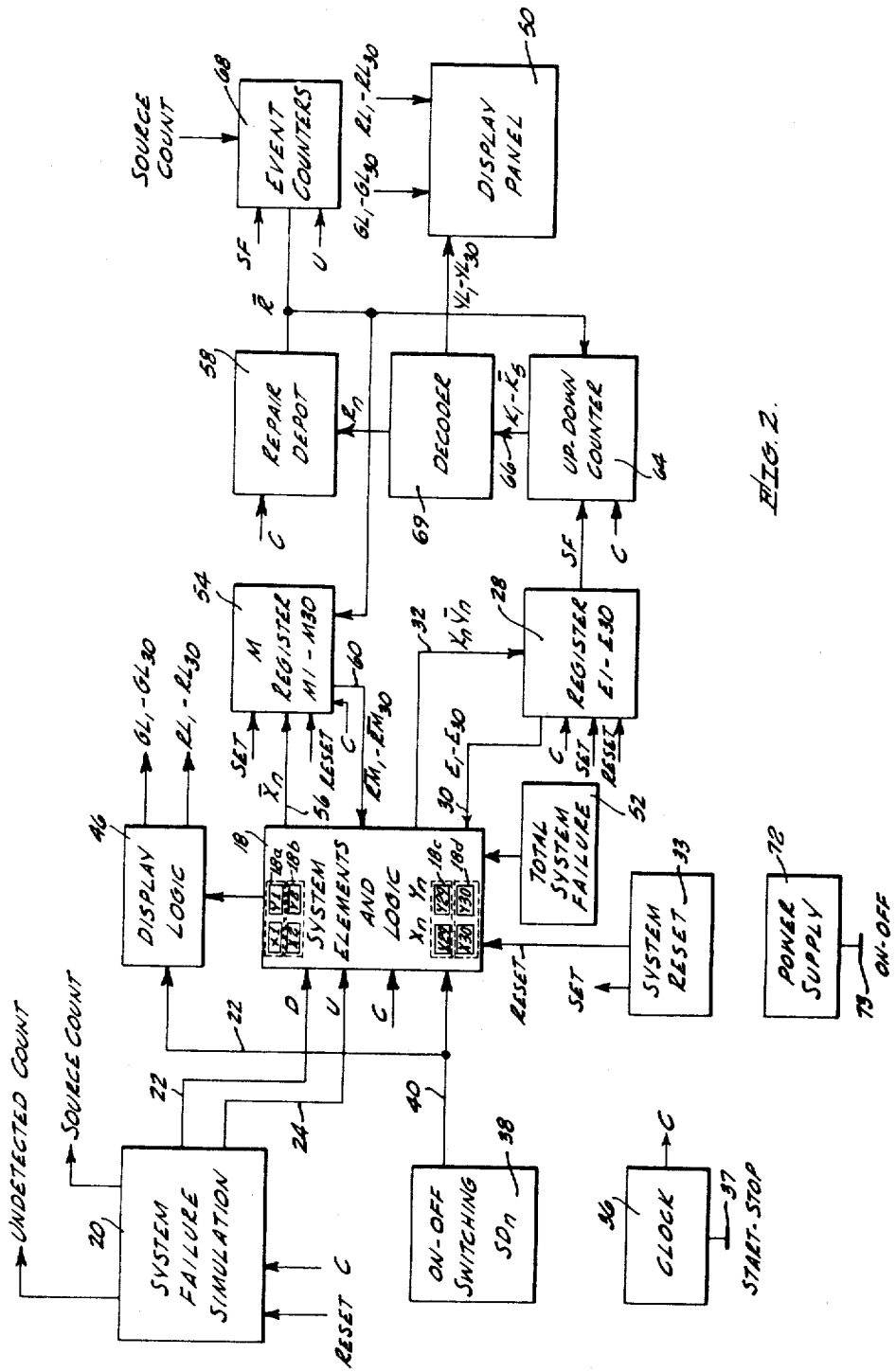
FIG. 2 is a schematic block diagram of the reliability simulator system in accordance with the principles of the invention.

Referring first to the functional diagram of FIG. 1, the simulator in one arrangement in accordance with the invention simulates a complex of systems or units with a population that is selected up to 30 systems, for example. The simulated systems may be any of a plurality of types of systems such as ground-based, fixed or mobile weapons, satellites, automobiles or any type of system or unit that is subject to failure which may be detected and may be repaired at a predetermined or random repair rate. As problems in maintainability can be proportionally reduced in time scale, the time of simulated operations which may be in seconds, minutes and hours can be related to real time which may be in years. The simulator system may during initiation of a reliability simulation problem operate with all simulated systems being energized which may be 30 system elements, for example, or may operate with a selected number of those system elements. Each system element stores states 1 through 4 which respectively simulate any operating condition, an undetected failure condition, a detected failure condition and a repair condition. A clock is initiated at the start of the operation. Each of the system elements is then subjected to random detected failures and to random undetected failures which mathematically both have a Poisson probability distribution, that is, a distribution which is proportional to $e^{-\lambda t}$ where $\lambda$ is the inverse of the mean time to failure or is the average failure rate. Failures are provided by a geiger counter tube responding to the random decay of a mass of radioactive atoms, that is, a certain average fraction of the surviving atoms decay in each time interval and produce radiation such as gamma rays. The radium salts used have a decay half life of hundreds of years and thus the average rate is essentially constant. Each operating system in the block 10 then effectively moves to a block 12 when an undetected failure event occurs and to a block 14 representing state 3 upon the occurrence of a detected failure. System elements in the block 12 which have an undetected failure are also equally subject to detected failure pulses along with system elements in the block 10 so that the system elements with undetected failures are also subject to random failures to move to the block 14.

The system elements in block 14 which have a temporary state are continuously sampled and tranferred to a repair depot of block 16. Systems in the repair depot of block 16 (state 4) as well as systems temporarily in block 14 are then subject to repair pulses to be transferred to the operating system block 10.

It is to be noted that systems having detected failures are subject to the same repair pulses as failed systems so that the temporary storage in block 14 does not affect the system analysis. The repair rate may be determined by either a fixed or periodic repair rate, a random repair rate having an exponential probability distribution or a repair rate having a geometric distribution which defines the probability of events happening after fixed intervals of time may be expressed as $$\frac{N}{N_o} = (P)^n (q)^{n-1}$$

where N is the number of successful events, $N_o$ is the number of attempts, $n$ is the attempt number and P is the probability that the event will be successful on any one attempt. Geometric distribution as well known in the art is explained in further detail on page 21 of "Reliability: Management Methods," by David K. Lloyd and Myron Lipow, Prentice Hall, Inc., 1962.

In the simulator of the invention, a correlation is not provided between specific systems in repair and in the operate block 10. As soon as a system element is transferred to the repair depot of block 16, it loses its individual identification and may be the next system to be repaired. Because no significance is attached to the time history of a particular display element but rather to the behavior of all of the activated elements, the loss of individual identification in the repair depot does not provide a loss of knowledge. The indication provided by the simulator of the invention to an observer is realistic and the displayed information corresponds to the statistical requirements.

When determining the reliability of a population of a system or unit in the simulator in accordance with the invention, the system or unit is assumed to have characteristics of a need for a condition alert status with some equipment not functioning and to have a field checkout that frequently or continuously monitors some portion of all equipments. Also associated with the actual systems is a maintenance complex through which systems are circulated either due to observed failures and replacements or by periodic scheduled maintenance. The systems are restored to a known reliability close to 1.0. For one type of determination the number of good or operating systems is the parameter of interest at any time taken at random. Another assumed characteristic of the actual systems are that they have identical constant failure rates, that is, the average failure rate does not change with time. However, as will be explained subsequently, the average failure rate may be adjusted if desired for solving a problem. It is to be understood that these assumed system characteristics are only necessary in accordance with the invention for solving problems involving maintainability of a population of systems or devices and do not limit the scope of the invention because the system is applicable to solving many types of probability problems. For example, the simulator in accordance with the invention is also useful in both system and subsystem analysis for predicting the results of design changes, for apportionment problems, for human factor problems, for logistic problems and for cost effectiveness purposes.

Referring now to the simulator system block diagram of FIG. 2, the elements 18 of the system to be analyzed includes 30 elements such as 18a, 18b, 18c and 18d each simulating an actual system, device or unit and including two flip flops X$n$ and Y$n$ where $n$ may be any number from 1 to 30, for example. The elements 18a, 18b, 18c and 18d respectively include flip flop pairs X1 and Y1, X2 and Y2, X29 and Y29, and X30 and Y30. The elements including pairs of flip flops X3 and Y3 to X29 and Y29 are not not shown for convenience of illustration. The binary states 1 through 4 of each pair of flip flops X$n$Y$n$ respectively indicate whether that element is in an operate state, an undetected failure state, a detected failure state or a repair state. A source 20 of system failure simulation pulses applies random detected pulses D and random undetected pulses U through respective leads 22 and 24 to the system elements 18. An E register 28 which includes a continuously operating ring counter applies identification signals $E_1$ through $E_{30}$ to the elements 18 through a lead 30 so that each element is sequentially gated to be responsive to the presence of both a detected and an undetected pulse. Also, the E register 28 includes logic to continuously sample each element for a detected failure indicated by $X_n \overline{Y}_n$ being applied thereto through a composite lead 32. The source of failure simulation pulses 20, the system elements 18 and the E register 28 all respond to reset signals from a source 33 for establishing initial states and to respond to clock signals C from a source of clock signals 36. A start-stop switch 37 is provided at the clock 36. For selecting a population of a desired number of system elements between 1 and 30, a source of on-off switching signals 38 applies signals $SD_n$ through a composite lead 40 to the system elements 18 as well as to display logic 46. In response to the first and second states of the system elements 18, the display logic 46 respectively develops green indicator light signals $GL_1$ through $GL_{30}$ and red indicator light signals $RL_1$ through $RL_{30}$ which control specific element lights on a display panel 50. A source 52 of total system failure is coupled to the elements 18 for transferring all systems to the repair depot.

An M register 54 or matched waiting register operates to simulate the repair of system elements at varying time intervals but at a constant predetermined average rate of repair. The M register 54 includes a 30 stage ring counter which shifts a "one" state sequentially along the row of flip flops only when the system element currently sampled is in the operate or undetected failure states (states 1 or 2). However, if any system element is in the detected failure or repair state (states 3 or 4) indicated by $\overline{X}_n$ on a composite lead 56, the ring counter will stop and hold until that particular element is repaired. The signal $\overline{X}_n$ controls a gate to prevent the clock signal C from being applied to the ring counter. The M register 54 also receives a set signal, a reset signal and a repair pulse R from a repair depot 58.

Repair pulses R or $\overline{R}$ which may be random having either an exponential Poisson distribution or geometrical distribution or may have a selected fixed rate are applied to the M register 54 which in turn applies identified repair pulses $\overline{RM}_1$ to $\overline{RM}_{30}$ through a composite lead 60 to the system elements 18. The repair pulse $\overline{R}$ is also applied to an updown binary counter or add-subtract counter 64 which also receives a system failure pulse SF from the E register 28. The up-down counter 64 maintains a count of the total number of system elements currently in repair by counting up by one for every detected failure and by counting down by one for each repair pulse $\overline{R}$. The flip flops K1 to K5 in the counter 64 apply signals through a composite lead 66 to a decoder 69 in order to apply 30 yellow light signals $YL_1$ to $YL_{30}$ to the display panel 50. A display of event counters 68 accumulates the total number of repair pulses, source counts, undetected failures and detected failures. The event counter 68 also includes a timing arrangement to record system operate time. Suitable power supplies are provided as indicated by a power supply 72 having an on-off switch 73 which is utilized to start and stop the system operation. Suitable DC and AC power supplies having on-off switches are well known in the art and the power supply will not be explained in further detail.

Figure 5:
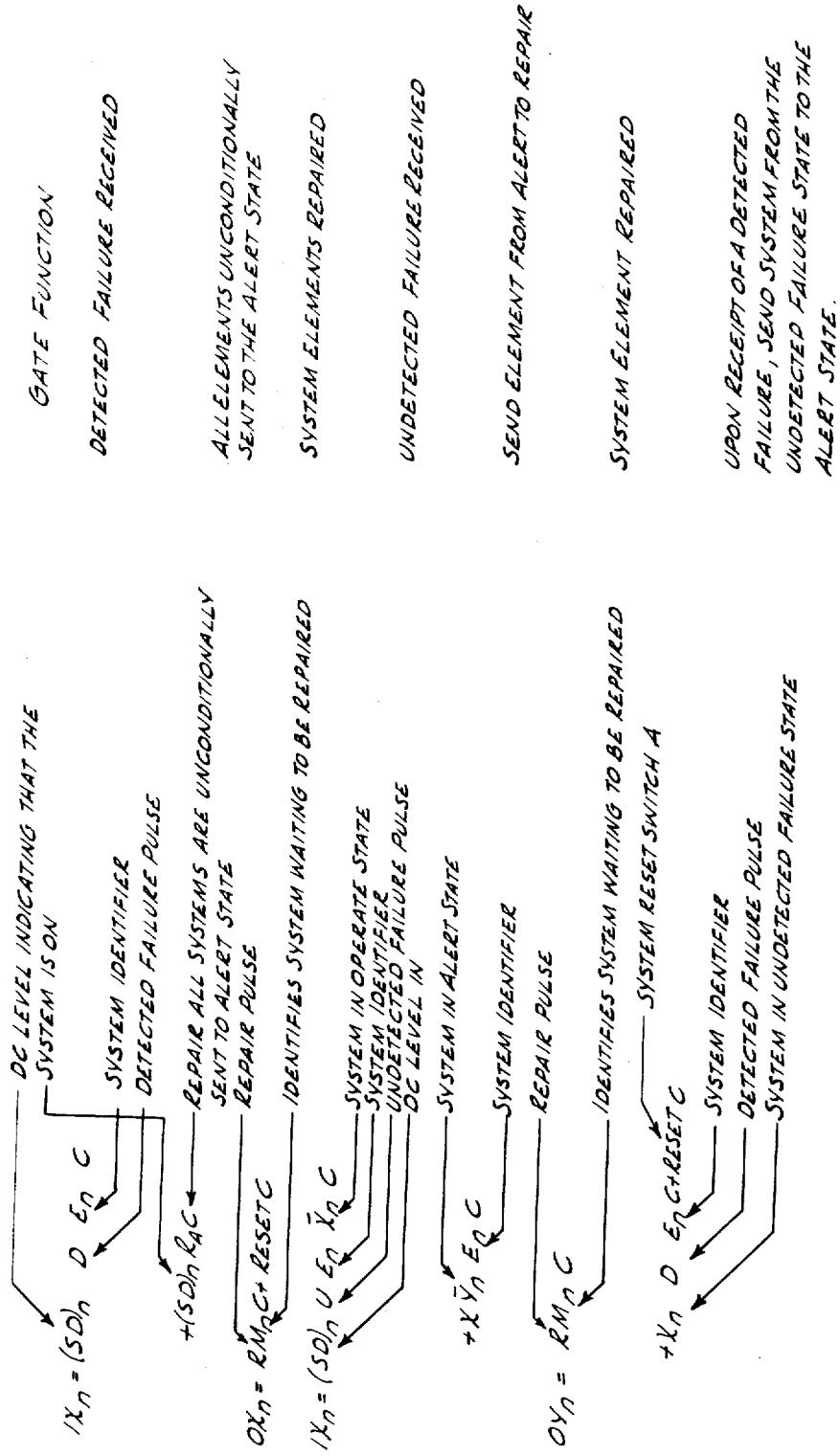
FIG. 5 is a list of logical equations for explaining the term breakdown of the logic of the element of FIG. 3.
Figure 26:
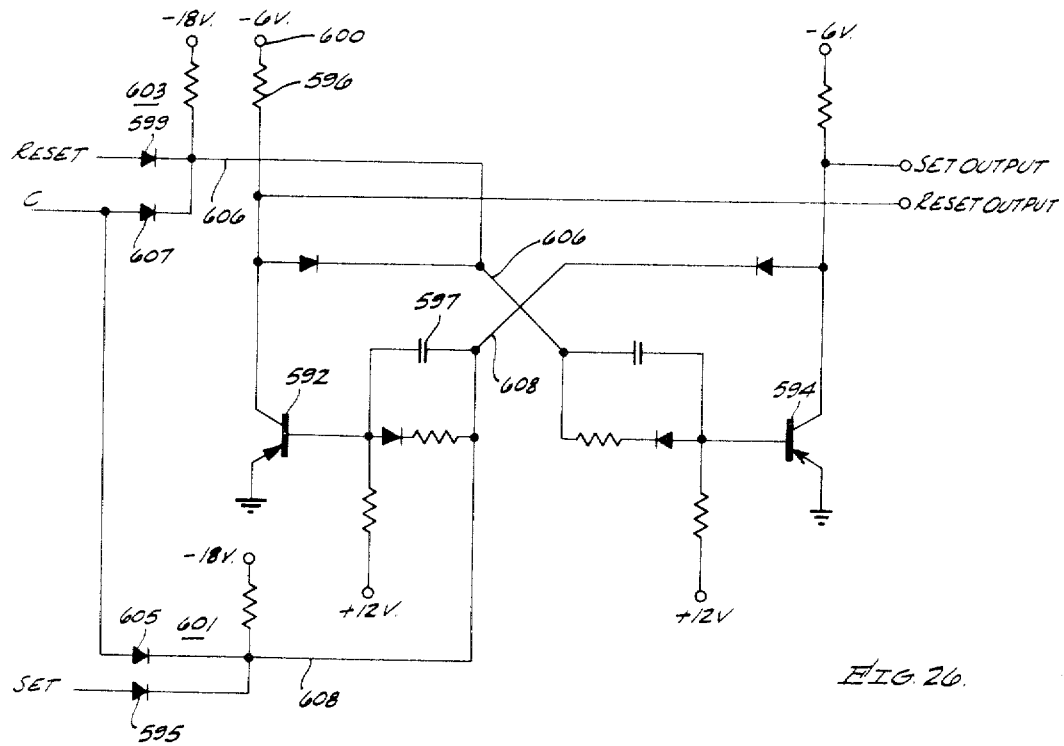
FIG. 26 is a schematic circuit diagram of a typical flip flop with negative "and" gates that may be utilized in the system of FIG. 2 when negative "and" or "nand" logic is utilized in accordance with the principles of the invention.
Figure 27:
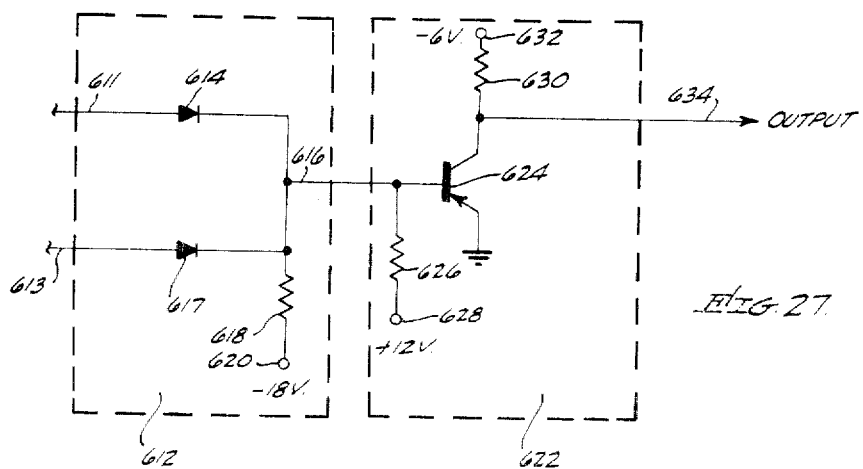
FIG. 27 is a schematic circuit diagram of a typical negative "and" gate that may be utilized in the system of FIG. 2 in accordance with the principles of the invention.

Referring now to FIGS. 3, 4 and 5, a typical system element X$n$Y$n$ will be explained in further detail. It is to be noted at this time that throughout the explanation of the illustrated system arrangement a flip flop is designated as X$n$, for example, with the output terminal which is true when the flip flop is set designated as X$n$ and the output terminal which is true when the flip flop is reset or in the false state designated as $\overline{X}n$. The table of FIG. 4 lists the four possible states 1, 2, 3 and 4 respectively representing an element in operation, an undetected failure, a detected failure and an element in the repair depot which respectively provide a display of a green light, a red light, the absence of a light and a yellow light. The flip flop X$n$ has a first gate 74 which may be a negative "and" gate and responds to $(SD)_n DE_n$ where, as may be seen in FIG. 5, $(SD)_n$ is a DC level indicating that the system element is selected to be energized and is provided by the switching source 38 of FIG. 2. The logical term D is a detected failure pulse, $E_n$ is a system identifier applied from the E register 28 and C is the clock pulse applied from the clock source 36. The "nand" gates 74 and 76 apply signals to a "nand" gate 75 which functions as an "or" gate. The flip flop X$n$ is also set true by a gate 76 in response to $(SD)_n$, a clock pulse and a "repair all" pulse $R_a$ applied to each system element from the source of total failure 52, which gate changes all elements to the alert state, that is, from state 00 to state 10. The flip flop X$n$ is set to the false state at clock time by an identified repair pulse $\overline{RM}_n$ applied to a "nand" gate 77 where R is a repair pulse generated by the repair depot 58 and $M_n$ is an indentifying pulse generated by the ring counter in the M register 54. Also, the flip flop X$n$ is triggered to the false state at clock time in response to a reset signal applied to a "nand" gate 79, functioning as an inverter and in turn to the "nand" gate 77. The flip flop Y$n$ is set to the true state by energizing a gate 78 in response to a clock term C and a logical term $(SD)_n UE_n \overline{X}_n$ where U is an undetected failure pulse and $\overline{X}_n$ indicates that the system is in the operate state. The "nand" gate 78 changes the system element to the undetected failure state. A "nand" gate 80 also sets the flip flop Y$n$ true through a "nand" gate 82 in response to a clock term C and the logical term $X_n \overline{Y}_n E_n$ where X$n$ indicates that the system is in the alert state and $E_n$ is a system identifier. The term applied to the gate 80 changes a system element from the alert state to the repair state. A "nand" gate 84 sets the flip flop Y$n$ false in response to a clock pulse C and a logical term $\overline{X}_n DE_n$ in which $\overline{X}_n$ indicates that the system is in an undetected failure state, the gate 84 responding to send a system from the undetected failure state to the alert state. Also, the flip flop Y$n$ is set to the false state at clock time through a "nand" gate 86 in response to a logical term $\overline{RM}_n$ which indicates that the system element has been repaired. A reset term is applied to a "nand" gate 89 functioning as an inverter, and to the "nand" gate 86 to reset the flip flop Y$n$ in coincidence with a clock pulse C. It is to be noted that both the X$n$ and Y$n$ flip flops operate synchronously with the system as indicated by the clock inputs C. Although the system as illustrated operates with negative "and" logic, it is to be understood that the invention is not to be limited to any particular type of logic. Typical flip flops and "nand" gates that may be utilized in accordance with the invention are shown in FIGS. 26 and 27. It is to be noted that in the type of "nand" gate shown in FIG. 27 an open input functions as a true or negative signal so "nand" gates are utilized as inverters in the illustrated system.

Referring now to FIG. 6, the failure simulation source 20 includes a random pulse source 90 which in response to the emissions from decay of radioactive material having a "half life" of hundreds of years, applies a signal to an amplifier 92 and in turn to a monostable multivibrator 94 which provides pulse squaring of the signal. A "nand" gate 96 responds to both the signal developed by the delay multivibrator 94 and a signal applied from a control switch 98 through a lead 100. The switch 98, when in the "on" position maintains an effective true signal at the "nand" gate 96 and when in the "off" position maintains a ground or false signal at the "nand" gate 96 which prevents failure pulses from being applied to the simulator elements. A "nand" gate 102 utilized as an inverter is coupled between the "nand" gate 96 and a "nand" gate 106. The output terminal of the "nand" gate 96 is coupled to the reset terminal of a flip flop A2. A flip flop A2 is set in response to a signal from the $A_1$ output terminal of a flip flop A1. A "nand" gate 106 receives signals from the false output terminal of the flip flop A2 and from the gate 102 to apply a signal through a "nand" gate 107, functioning as an inverter, to the set terminal of the flip flop A1. The true output terminal of the flip flop A2 is coupled to the reset terminal of the flip flop A1 and to a "nand" gate 108. The true terminal ($A_1$) of the flip flop A1 is also coupled to the "nand" gate 108 which applies a source count to a lead 110 and after inversion in a "nand" gate 112 applies a signal $A_1 A_2$ to a lead 114. The multivibrator 94 and the flip flops A1 and A2 form a pulse shaping and clocking network such that every random pulse greater than two clock cycles in duration provides a composite output $A_1 A_2$ which is interpreted as a failure pulse. As will be explained in further detail subsequently, the rate of system failure is thus completely dependent upon the frequency of the random pulse source.

Referring now to FIG. 7, the random pulse source 90 includes a source of radioactive particles 114 positioned on a narrow length of mounting element 116 which may be spring steel, for example, and mounted to a base 118 with a suitable bolt arrangement 120. The radium source 114 may, for example, be radium salt as utilized on a conventional luminous watch hand. Radiation such as gamma rays emitted by the radioactive source 114 triggers a Geiger-Mueller tube 124 which is mounted on a mounting frame 126 at a selected distance which may be approximately 1/8 inch, for example, from the radioactive source 114. The tube 124 may, for example, be a Nuclear-Chicago D80 Geiger counter which is a gas filled diode. The condition for starting a discharge in this type of Geiger or Geiger-Mueller tube is that at least one low energy electron be produced within the tube by the radioactive rays. This single electron kindles an avalanche discharge which spreads rays throughout the length of the tube and lasts for a few hundred microseconds. As is well known in the art, a single electron is capable of triggering discharge which can be detected with substantially small amplification as discussed by H. Friedman, Geiger Counter Tubes, Proceedings of the IRE 37, page 791, July 1949. As is well known in the art, each nucleation of the atom at the radioactive source 114 undergoes a radioactive decay which may emit a neutron to the tube 124. The radioactive source which may have a half life of approximately 200 years emits these neutrons in a random manner, that is, with a Poisson probability distribution. This random decay of radioactive substance is well known in the art such as discussed on page 32 of a book, "The Mathematics of Physics and Chemistry," by H. Margenan and G. M. Murphy, June 1941, published by D. Van Nostrand Co., Inc., New York. It is to be understood that within the principles of this invention other types of radioactive sources may be utilized other than the gamma radiation source 114 such as a source of beta or alpha particles. Beta particles may be utilized with a Geiger counter tube 124 having a relatively thin wall and alpha particles as is well known in the art require operation within a vacuum chamber.

Because the gamma particles (photons) are released from the radioactive source 114 at random angles toward the tube 124, increasing the distance between the source 114 and the tube 124 results in less particles striking the tube to develop random pulses. Thus, an adjustable screw 130 mounted to a frame 132 by a threaded nut and rotatably applied to the structure 116 is utilized to increase or decrease the distance between the radioactive source 114 and the tube 124 to provide a variable average rate. Increasing and decreasing the distance between the radioactive source and the tube 124 respectively decreases and increases the average rate of generation of random failure pulses.

Referring now also to FIG. 8, the Geiger-Mueller tube 124 has a cathode coupled to ground and an anode coupled through a resistor 138, a lead 143 and a resistor 139 to the positive terminal of a suitable source of potential indicated by a battery 137 having a negative terminal coupled to ground. The lead 143 is coupled through a coupling capacitor 140 to the base of an npn type transistor 142 included in the amplifier 92 and having an emitter coupled to a −6 v. terminal 144 and a collector coupled through a resistor 147 to ground. A biasing resistor 151 is coupled between the base of the transistor 142 and ground. The collector of the transistor 142 is coupled to the base of an npn type transistor 144 having a cathode coupled to ground and in turn coupled to a lead 146 which applies an amplified pulse of a waveform 148 to the monostable multivibrator 94 of FIG. 6.

Figure 9:
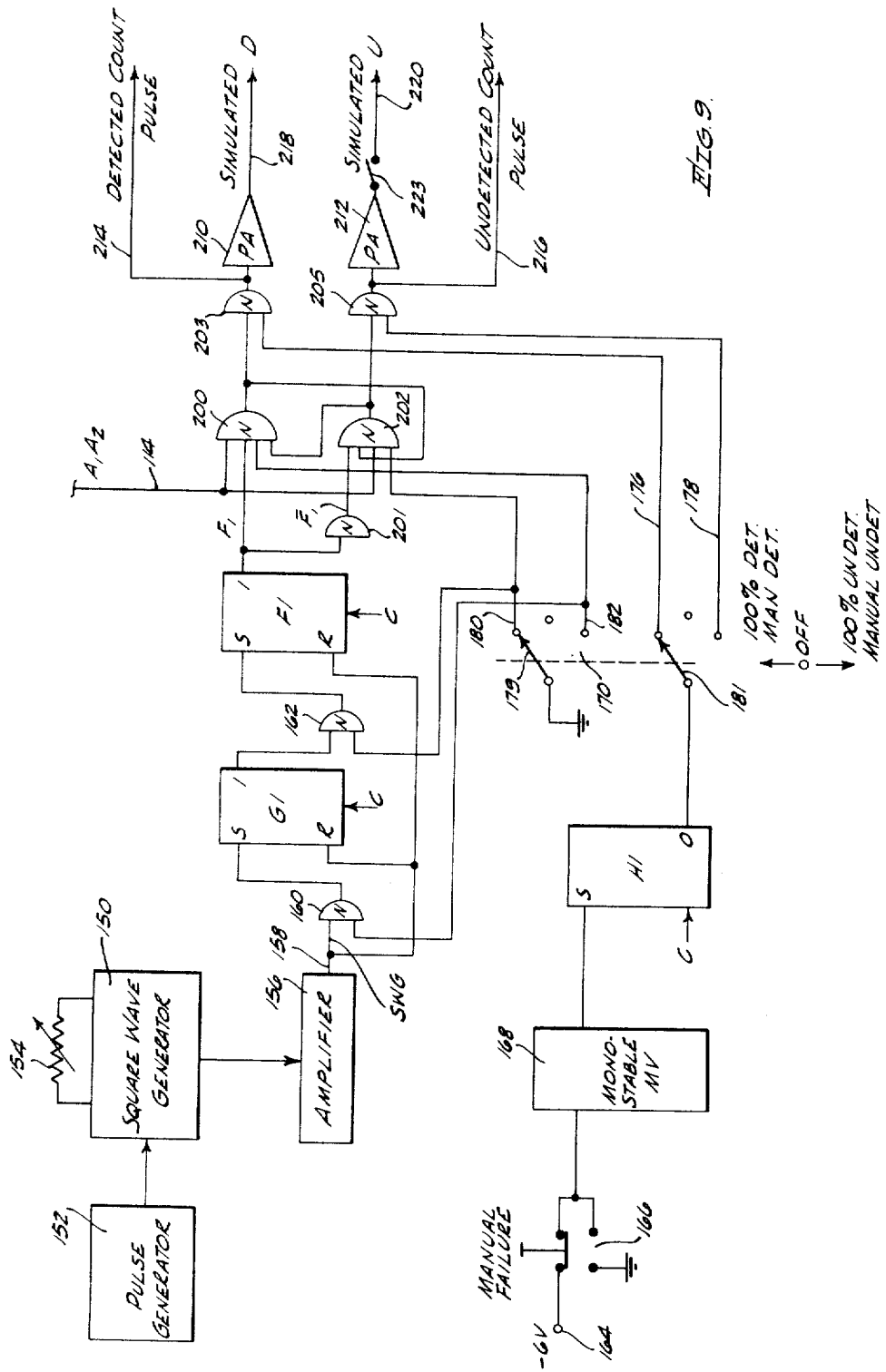
FIG. 9 is a schematic circuit and block diagram of the control and synchronizing circuits utilized in the failure pulse generator of FIG. 2.

Referring now to FIG. 9 as well as to FIG. 6, the other portion of the system failure simulation source 20 gates the generated failure pulses $A_1A_2$ with the output of a square wave generator 150 after synchronization with the clock, to develop gated output signals $A_1A_2F$ and $A_1A_2\bar{F}$ respectively representative of the detected and undetected random pulses D and U. The square wave generator 150, which responds to a conventional pulse generator 152 which may operate at a 2.5 kc. (kilocycle) rate, includes a control 154 for providing a variable pulse width. As will be explained subsequently, variation of the width of the pulse of the generator 150 between 10 and 390 microseconds, for example, varies the average frequency of occurrence of the detected and undetected pulses to develop two random sources with each having probability distribution as close to Poisson as necessary for the simulation as if developed from separate random sources. The square wave generator 150 is coupled through an amplifier 156 to a lead 158 and a "nand" gate 160 serving as an "and" gate which is coupled through an inverter to the set terminal of a flip flop G1. The true output terminal of the flip flop G1 is coupled through a "nand" gate 162 serving as an "or" gate to the set input terminal of a flip flop F1. The lead 158 is also coupled through an inverter to the reset input terminals of both flip flops G1 and F1. In order to provide a manual failure source, a suitable terminal such as a −6 v. terminal 164 is coupled through a switch 166 to the input terminal of a monostable multivibrator 168 and in turn to the set input terminal of a flip flop H1 having a reset terminal coupled to the source of clock pulses. The flip flop H1 is arranged similar to the typical circuit of FIG. 26 except only the clock pulse is applied to the reset terminal gate and only the monostable multivibrator pulse is applied to the set terminal gate. The false output terminal of the flip flop H1 is coupled through a switch 170 which applies the manual failure signals from an arm 181 to either leads 176 or 178. Also, the switch 170 includes an arm 179 coupled to ground and selectively movable to either leads 180 or 182, the lead 180 being coupled to the gate 162 and the lead 182 being coupled to the gate 160. To provide control during manual failure operation, the true output terminal of the flip flop F1 applies a signal $F_1$ to a "nand" gate 200 and an inverted signal $\bar{F}_1$ developed by a "nand" gate 201 to a "nand" gate 202. The signals $A_1A_2$ on the lead 114 is applied to both of the gates 200 and 202. The purpose of leads 180 and 182 is to implement a 100% detectable failure simulation mode (with the arm 179 at position 180) and a 100% undetectable failure simulation mode (with the arm 179 at position 182). The lead 180 (if grounded through switch 179) connected to "nand" gate 162 (functioning as a logical "or") will effectively hold flip flops F1 in the "one" state by allowing it to be continually one-set; thus simulating a continuous 100% detected failure condition. The lead 180 applies a signal to inhibit the gate 202, which is the undetected failure gate, thus insuring this 100 percent detected failure condition. The lead 182 (if grounded through switch 179) connected to "nand" gate 160 (functioning as a logical "and") will inhibit one setting flip flop G1. Since flip flop G1 is now zero set, the gate 162 output signal will be at zero volts and will not change until switch 170 is switched. Thus, flip flop F1 cannot be one-set during this time and its state is therefore $\bar{F}_1$ or false which simulates a continuous undetectable failure (100% undetected) simulation mode. The lead 182 inhibits the gate 200 (which is the detected failure gate) thus insuring this 100 percent undetected failure condition. The output signal developed by the "nand" gate 200 is applied both as an input signal to the gate 202 and an input signal to an "or" gate 203 which may be a "nand" gate, and in turn coupled to an amplifier 210. The output signal of the "nand" gate 202 is applied both as an input signal to the gate 200 and as an input signal to an "or" gate 205 which may be a "nand" gate, and in turn coupled to an amplifier 212. The leads 176 and 178 provide input signals to a "nand" gate serving a logical "or" function. These leads permit the manually initiated failure pulse initiated by the switch 166 to be gated in a logically "or" manner to either the simulated D or U leads 218 or 220 respectively. Detected and undetected count pulses are respectively applied through leads 214 and 216 to the event counters 68 (FIG. 2). The detected signal pulses D and the undetected signal pulses U are applied to respective leads 218 and 220 for use in the system elements 18 of FIG. 2. A switch 223 is provided in the lead 220 which is opened to allow operation with only detected failures having an average rate variable by the square wave generator 150. To further describe the function of the switch 170, when the arms 179 and 181 are in the position shown, one-hundred percent detected failures are provided by manual operation. When the arms 179 and 181 are in the lower position, all undetected manual failures are provided.

Figures 10, 12:
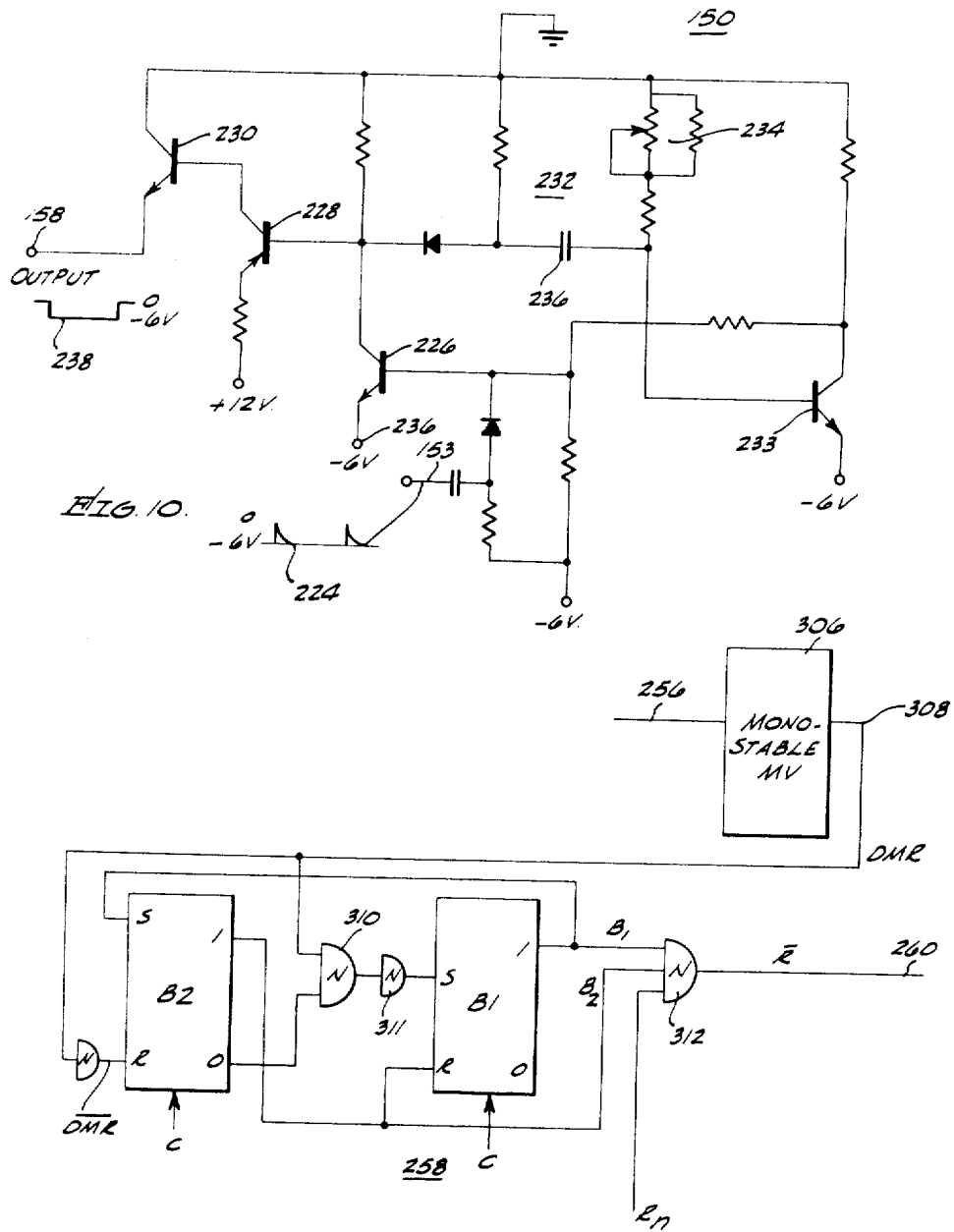
FIG. 10 is a schematic circuit diagram of the variable width square wave pulse generator utilized in the portion of the failure pulse source shown in FIG. 9.
FIG. 12 is a schematic circuit and block diagram of the repair pulse synchronizing circuit utilized in the repair pulse source of FIG. 11.

Referring now to FIG. 10, a circuit is shown that may be utilized for the variable pulse width square wave generator 150 of FIG. 9. The trigger pulses on the lead 153 developed by the pulse generator 152 shown by a waveform 224 are applied through a suitable coupling and biasing arrangement to the base of an npn type transistor 226. The collector of the transistor 226 is coupled to the base of a pnp type transistor 228 in turn having a collector coupled to the base of an npn type transistor 230. The transistors 226, 228 and 230 are biased at suitable operating points with the base of the transistor 228 coupled to a timing circuit 232 including a variable resistor 234 fromming the adjustable width control 154 of FIG. 9 and a capacitor 236 in turn coupled to the base of an npn type transistor 233 for providing a one shot operation. Thus, in response to a trigger pulse of the waveform 224 the transistor 226 having an emitter coupled to a −6 v. terminal 236 is biased into conduction to in turn bias the transistors 228 and 230 into conduction and develop a negative pulse of a waveform 238 having a duration determined by the setting of the variable resistor 234. Thus, a pulse having a width which may be varied between 5 to 370 microseconds, for example, is applied to the lead 158 to form pulses which determine the ratio of detected to undetected failures simulated through the gates 200 and 202. The operation of the type of circuit shown in FIG. 10 is well known in the art and will not be explained in further detail.

Referring now to FIG. 11 which shows the repair depot 58, repair pulse sources 244, 246 and 248 selectively provide periodic repair simulation, random repair simulation and probabilistic repair simulation. The repair pulse source 244 includes a relaxation oscillator 241 which applies periodic repair pulses having selective rates to a pulse shaper 250 to form a signal $\overline{R}_{ot}$ which in turn is applied to a delay multivibrator 252 to develop a repair signal $R_{ot}$. A relay driver 253 responds to an "or" gate 251 to apply a signal through a lead 249 to the oscillator 241 for maintaining the oscillator 241 in the "off" condition and at a desired bias level in response to a repair inhibit pulse $\overline{R}_n$. A repair selection mode switch 254 when in repair mode 1 couples the periodic repair signal $R_{ot}$ to a lead 256 and through a pulse shaping and synchronizing circuit 258 to a lead 260 as a repair pulse $\overline{R}$. An arm 300 of the switch 254 applies a "true" control signal to the repair on-off "or" gate 251 for the off mode so that the oscillator 246 is held in the "off" condition. An arm 298 applies a "false" or inhibiting level to the "nand" gate 284 during the off mode of switch 254. Signal $\overline{R}_n$, applied to "or" gate 251, is a control signal used to hold oscillator 246 in the "off" condition so the repair signals are not developed in the absence of system elements in the repair depot.

The random repair simulation source 246 includes a radioactive source 264 which is coupled through an amplifier 266 and a one shot multivibrator 268 to a lead 270 as a pulse $\lambda_2$. The radioactive source 264 and the amplifier 266 may be similar to those shown in FIGS. 7 and 8 and will not be explained in further detail. An oscillator 274 which may operate at 2.5 kc. applies a pulse to a variable pulse width square wave generator 276 which in turn applies a square wave pulse through an amplifier 278 to a lead 280 as a pulse $G_2$. It is to be noted that the square wave generator 276 may be similar to that shown in FIG. 10. The "nand" gate 284 responds to the signals on the leads 270 and 280 as well as a signal from the switch 254 to apply a random repair pulse $\overline{\lambda_2 G_2}$ to a lead 286 which in turn is coupled through nand gate 285 operating as an inverter to terminal two of the switch 254. In repair mode 2 of the switch 254, the pulses on the lead 286 is applied to the lead 256 and through the synchronizing circuit 258 to the lead 260 as a repair pulse $\overline{R}$.

The probabililistic repair pulse source 248 includes a "nand" gate 288 operating as an inverter of the signal on the lead 286 which in turn is coupled through a "nand" gate 290. A "nand" gate operating as an inverter applies the signal developed by the gate 290 to the set terminal of a flop flop P1. The other input terminal of the "nand" gate 290 is the periodic repair pulse $R_{ot}$ derived from the source 244 which pulse is also applied to the reset terminal of the flip flop P1. The coincidence signal developed by the "nand" gate 290 sets the flip flop P1 to develop repair pulses P at the true output terminal thereof which is applied through a lead 294 to the terminal three of the switch 254. Thus, the switch 254 having wiper arms 296, 298 and 300 selectively applies repair pulses $R_{ot}$, $\lambda_2 G_2$ and P to the lead 246. An inverter is coupled to the lead 260 to develop a repair pulse R on a lead 261.

Referring now to FIG. 12, the clock synchronizing circuit 258 responds to the selected mode of repair pulses applied to the lead 256 and to the clock pulse C to synchronise the random repair pulses. A delay multivibrator 306 is coupled to the lead 256 to apply a signal (DMR) through a lead 308 and a "nand" gate 309 operating as an inverter, to the reset terminal of a flip flop B2 as well as to a "nand" gate 310. The false output terminal of the flip flop B2 is coupled to the "nand" gate 310. The true output terminal of the flip flop B2 is coupled to the reset terminal of a flip flop B1. The signal developed by the "nand" gate 310 is inverted in a "nand" gate 311 and applied to the set terminal of the flip flop B1. The set input terminal of the flip flop B2 is responsive to the true output terminal of the flip flop B1 and the true output terminal of the flip flop B2 is applied to a "nand" gate 312 in conjunction with the true output signal developed by the flip flop B1. A repair inhibit pulse $R_n$ is applied to the gate 312 for preventing repair pulses $\overline{R}$ from being applied to the lead 260 in the absence of any system elements being in the repair depot.

Figure 13:
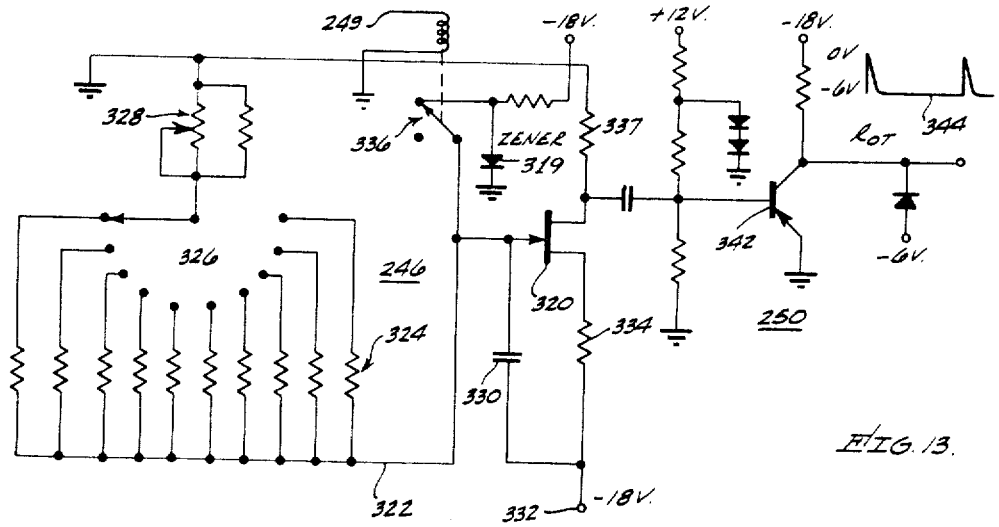
FIG. 13 is a schematic circuit diagram of the variable rate relaxation oscillator utilized in the repair pulse source of FIG. 11.

Referring now to FIG. 13 as well as to FIG. 11, a variable frequency relaxation oscillator that may be utilized for the relaxation oscillation 246 of the periodic repair source 244 includes a unijunction transistor 320 having an emitter coupled through a lead 322 and a plurality of selectabble resistors 324 to the movable arm of a switch 326 which in turn is coupled through a variable resistor 328 to a suitable source of reference potential such as ground. As is well known in the art, a unijunction transistor is a negative resistance device which when biased with the load line crossing its characteristic curve in both the cut off region and the negative resistance region and with a capacitance coupled between the emitter and ground and of a value sufficiently large to sustain oscillations. The emitter of the transistor 320 is coupled through a shunt capacitor 330 to a −18 v. terminal 332. One base terminal of the transistor 320 is coupled through a resistor 334 to the terminal 332 and the second base terminal is coupled through a resistor 337 to ground. Selection of the combined resistance values of the resistor 328 and a selected resistor 324 in conjunction with the capacitor 330 varies the firing time of the transistor 320 from 0.1 to 110 seconds, for example. A repair turn off switch 336 either removes or applies a −13 volt potential to the emitter of the transistor 320 to respectively turn on or turn off the random source of repair pulses and to maintain a desired bias at the base of the transistor 320 when the oscillator is unenergized. A zener diode 319 having a 5 volt drop is coupled to the switch 336. The pulses developed by the negative resistance action of the unijunction transistor 320 are applied from the second base thereof through a suitable biasing arrangement to the base of a pnp type transistor 342 which in turn is suitably biased to form the pulse shaper circuit 250. Thus, pulses $\overline{R}_{ot'}$ as shown by a waveform 344 are applied through the delay multivibrator 252 to the repair mode switch 254 with a frequency dependent upon the periodic repair rate selected at the switch 326.

Figure 14:
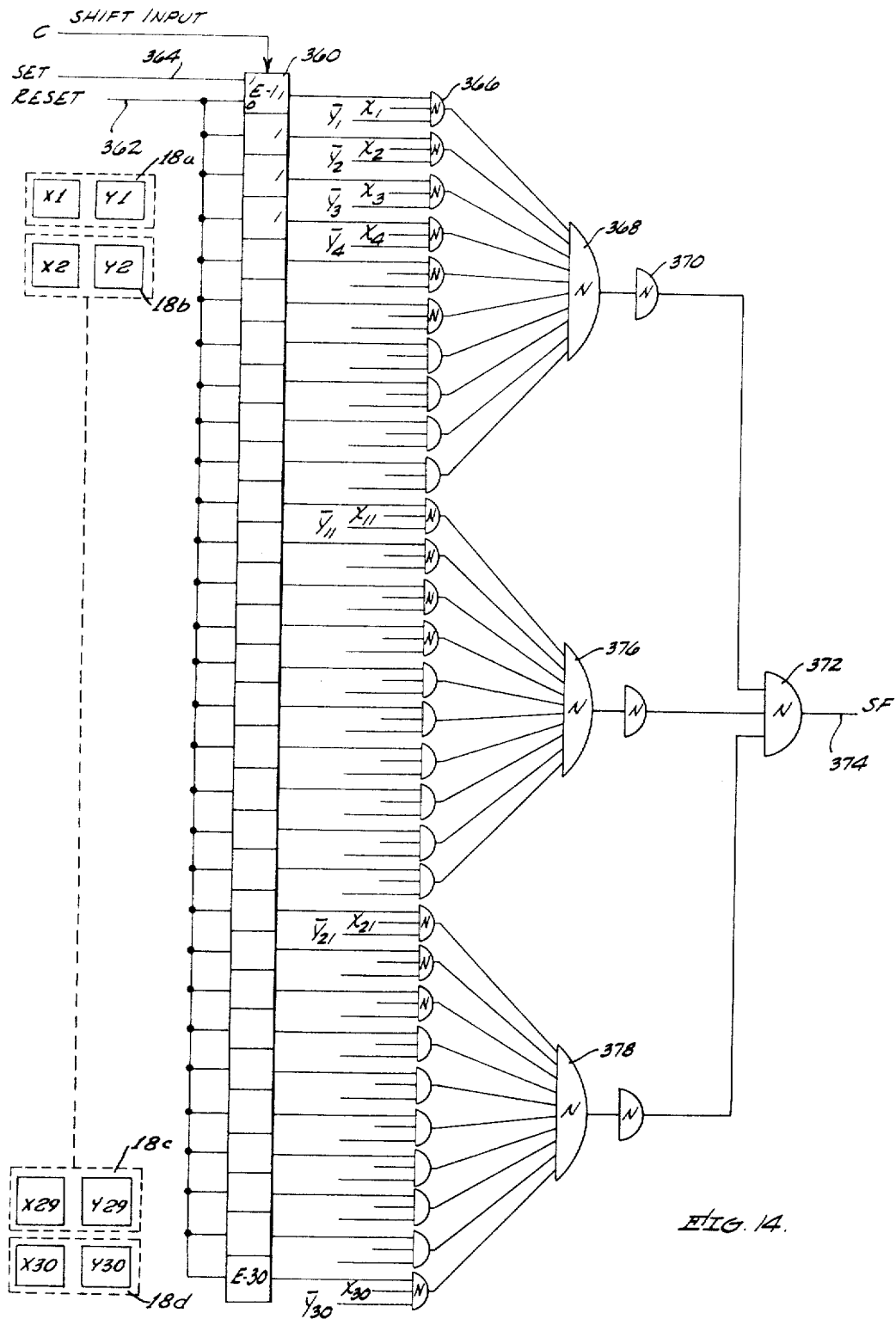
FIG. 14 is a schematic circuit and block diagram of the E register and logical gates utilized in the system of FIG. 2.

Referring now to FIG. 14 which shows the E register and associated logic, a ring counter 360 which may be a conventional type as well known in the art responds to a clock signal as the input shift pulse. For example, a ring counter of the type that may be utilized for the ring counter 360 is described on page 362 of a book, "Digital Computer Principles," by Burroughs Corporation and published by McGraw-Hill Book Company. A reset signal is applied from the system reset source 33 (FIG. 2) to a lead 362 and to each of the 30 flip flops E1 through E30 for setting them to their zero state. In order to initially insert a "one" into the flip flop E1 which may be continuously recirculated in the ring counter, a set pulse is applied from the source 33 (FIG. 2) through a lead 364 to the set terminal of the flip flop E1. As each flip flop E1 through E30 is triggered to the true or "one" state, a signal is applied to the true output terminal and to a "nand" gate such as 366. Signals such as $X_1$ and $\overline{Y}_1$ representative of the detected failure state three of the corresponding system elements, shown as 18a, 18b, 18c and 18d, are applied to the corresponding "nand" gate such as 366 for sequentially sampling the system elements for detected failures. A signal is applied from ten "nand" gates such as 366 to a "nand" gate 368 and through "nand" gate 370, functioning as an inverter, to a "nand" gate 372 to develop a system failure pulse SF on a lead 374. Additional "nand" gates 376 and 378 are provided to respond to sample conditions of others of the 30 system elements and apply signals, after an inversion, to the gate 372. It is to be noted that the true output terminal $E_n$ of each of the flip flop E1 through E30 are applied to corresponding elements of FIG. 3, shown as 18a, 18b, 18c and 18d in FIG. 14, for sequentially and continuously identifying the system elements so as to be responsive to failure pulses.

Figure 15:
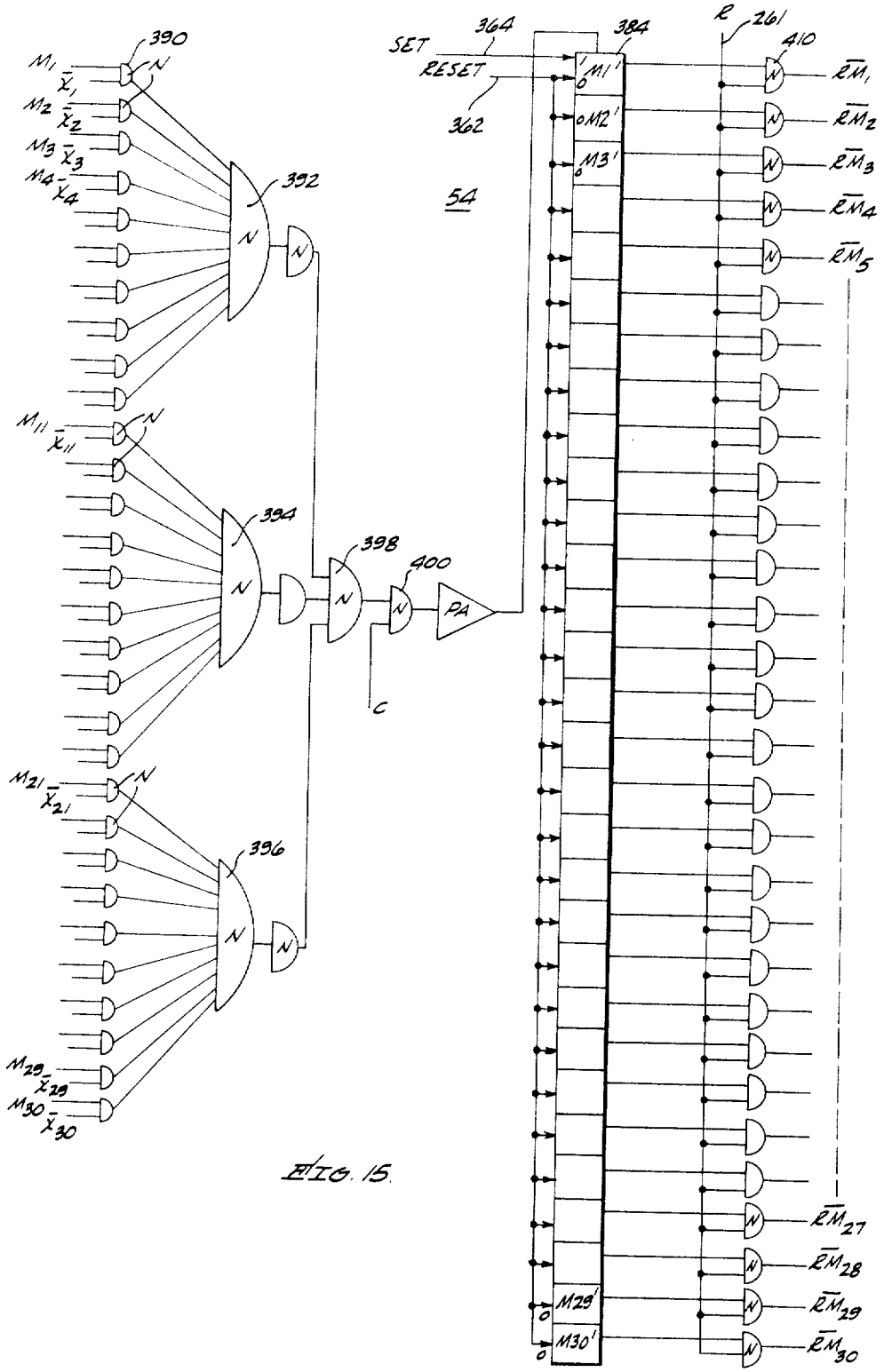
FIG. 15 is a schematic circuit and block diagram of the M register and logical gates utilized in the system of FIG. 2.

Referring now to FIG. 15 which shows the M register 54 and the associated logic, a ring counter 384 which is well known in the art and may be similar to that utilized in the E register, is provided with 30 stages or flip flops M1 through M30. A reset signal is initially applied through the lead 362 to the ring counter 384 and a set signal is applied through a lead 364 to the flip flop M1 to establish a "one" state therein. In order that the ring counter 384 sequentially searches for a system element in the repair states and stops and remains at that system element, a plurality of "nand" gates are responsive to the true output such as $M_1$ of the coresponding ring counter flip flop and to $\overline{X}_1$ representative of either an in operation or an undetected failure state to apply a signal to a "nand" gate 392. Other "nand" gates 394 and 396 respond to different gates similar to gate 390. The signals developed by the "nand" gates 392, 394 and 396 when the "one" state is transferred to each flip flop M1 through M30 for enabling the shifting operation of the M register, is inverted and applied to a "nand" gate 400 which also receives a clock signal. Upon energization of the gate 400, a clock signal is applied through a suitable amplifier to a lead 402 for shifting the "one" state in the ring counter 384. Thus, when $\overline{X}_1$, for example, goes false or to 0 volt representative of a system currently being sampled in either the detected failure or repair state (states 3 or 4), a clock pulse is not applied through the "nand" gate 400 and the shifting action of the ring counter 384 is temporarily stopped. Only when $\overline{X}_1$, for example, at the located element becomes true representative of a system in states 1 or 2 is the gate 400 again energized to allow continuance of the shifting operation. Thus, the M register locates a detected failure or a system in repair and continues to identify that system element until a repair operation is performed.

The repair operation is controlled by a plurality of 30 "nand" gates such as 410 each responsive to a repair pulse R applied on the lead 261 from the repair source (FIG. 11) and a true output signal from the flip flops M1 to M30 such as $M_1$. Thus the "nand" gate 410 in response to a repair pulse develops a signal $\overline{RM}_1$ which is applied to the system elements 18 as explained relative to FIGS. 3 and 5. When the system element is repaired and returned to state "one" (FIG. 4), $\overline{X}_1$, for example, goes true and the clock signal is gated through the "nand" gate 400 so that the ring counter 384 again shifts the "one" state.

Figure 16:
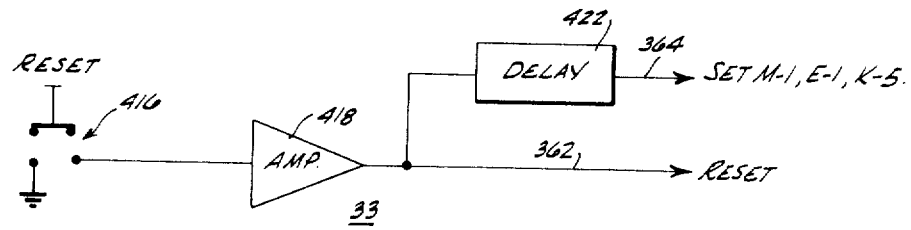
FIG. 16 is a schematic circuit and block diagram of the reset source utilized in the reliability simulator of FIG. 2.

Referring now to FIG. 16, the system reset source 33 includes a reset switch 416 which when energized applies ground potential through an inverting amplifier 418 which in turn applies a reset pulse to the lead 362. A delayed set pulse is then applied from the lead 362 through a delay line 422 to the lead 364.

Figure 17:
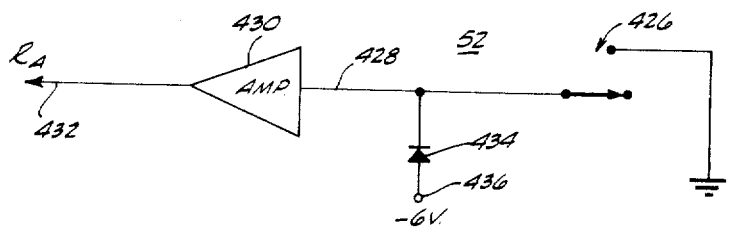
FIG. 17 is a schematic circuit and block diagram of the signal source for registering all or any number of systems initially in the repair or waiting condition utilized in the simulator of FIG. 2.

For simultaneously transferring all of the system elements to the repair depot, the source of total system failure signals 52 as shown in FIG. 17 includes a switch 426 coupled through a lead 428 and an inverting amplifier 430 to a lead 432 to which is applied a repair all pulse RA at a true level when the switch 426 is closed. The lead 428 is coupled through the cathode to anode path of a diode 434 to a —6 v. terminal 436 for maintaining a —6 v. or a true state on the lead 428 except when the switch 426 is energized.

Referring now to FIG. 18, the system on-off switching source 38 includes three rotatable switches each similar to that shown, for developing signals $SD_1$ through $SD_{10}$. Each wiper arm such as 440 sequentially moves to a plurality of contacts such as 444 and 446. The contacts such as 444 and 446 are interconnected in such a manner as well known in the art that for each movement of the wiper arms ground potential is applied through the wiper arm to an output lead such as $SD_{10}$ to back bias the diode such as 448 and remove the —6 v. or true potential of a terminal 450 from that lead. Thus, in response to each movement of the plurality of wiper arms up from a position corresponding to the terminal 446 an additional system is de-energized by the signal $SD_n$ going false or to ground potential.

Figure 19:
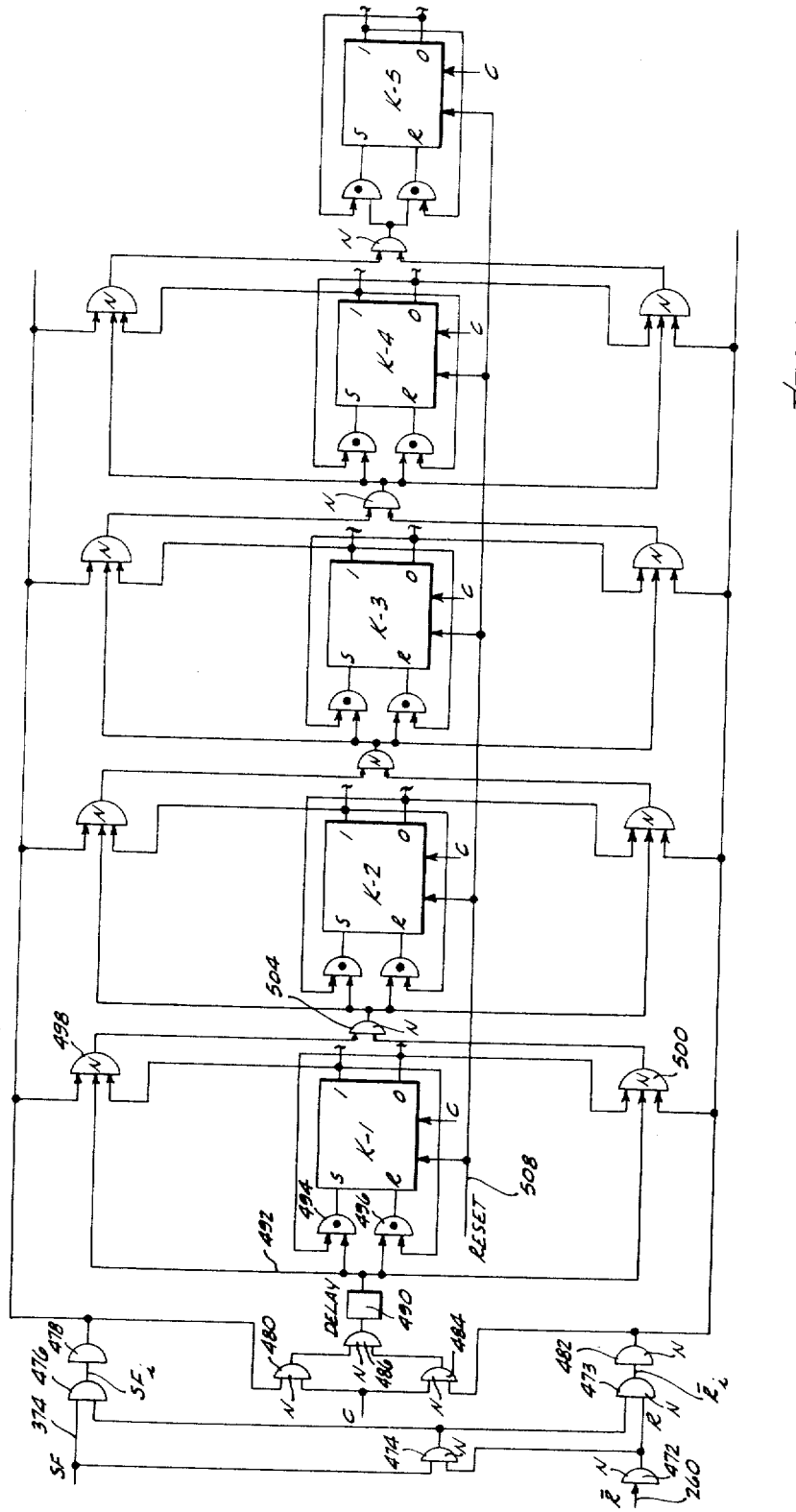
FIG. 19 is a schematic circuit and block diagram of the bidirectional counter utilized in the simulator of FIG. 2 for maintaining count of the number of elements being repaired.

Referring now to FIG. 19, a bidirectional counter that may be utilized for the up-down counter 64 of FIG. 2 includes flip flops K1 through K5 and is responsive to the system failure pulse SF on the lead 374 (FIG. 14) and to the repair pulse $\overline{R}$ on the lead 260 (FIG. 11) as well as to a clock signal C. The repair signal $\overline{R}$ is applied through a "nand" gate 472 for inversion to a signal R which in turn is applied to a "nand" gate 473 as well as to a "nand" gate 474. The signal developed by the "nand" gate 474 is applied to the "nand" gate 473 and in conjunction with the signal SF is applied to a "nand" gate 476. A "nand" gate 478 operating as an inverter is coupled between the "nand" gate 476 and a "nand" gate 480 also responsive to the clock pulses. A "nand" gate 482 operating as an inverter is coupled between the "nand" gate 473 and the "nand" gate 484 which in response to the clock pulse applies a signal to a "nand" gate 486. The "nand" gate 486 applies a signal through a delay line 490 to a lead 492 which in turn is coupled to "nand" gates 494 and 496 respectively triggering the flip flop K1 to the set and reset states. Associated with the flip flop K1 is a "nand" gate 498 having input terminals coupled to the lead 492 to the output terminal of "nand" gate 478 and to the true output terminal of the flip flop K1. A "nand" gate 500 responds to a signal developed by the "nand" gate 482, the delayed signal on the lead 492 and a signal on the zero output terminal of the flip flop K1 to apply a signal to a "nand" gate 504. Also, the "nand" gate 504 is responsive to the gates 498 and 500 to control the flip flop K2. The gate 494 is coupled to the false output terminal of the flip flop K1 and the gate 496 is coupled to the true output terminal of the flip flop K1. Each of the flip flops K1 through K5 have their logical gate arranged in a similar manner except that the flip flop K5 does not have gates corresponding to 498 and 500. A reset signal is applied from a lead 508 to the reset terminal of each of the flip flops K1 through K5. Thus, the input count pulses SF and R are applied through sets of five gates for counting up or forward in response to a detected failure and through a similar set of five gates for counting down in response to a repair pulse. The general logic for operation of the up-down counter of FIG. 19 may be explained as:

$SF_1$ is defined as $(\overline{SF\ R})$ SF where $\overline{SF\ R}$ is the signal at the output of the gate 474.

$R_1$ is defined as $(\overline{SF\ R})$ R $$1K_1 = C(SF_1 + R_1)\overline{K}_1 + RS_1$$

where $RS_1$ is the set signal developed in the circuit of FIG. 16.

$$0K_1 = C(SF_1 + R_1)K_1 + RS_0$$

where $RS_0$ is the reset signal developed in the circuit of FIG. 16.

let $C(SF_1 + R_1)$ be defined as $K_1CI$ $$1K_2 = \{SF_1K_1K_1CI + R_1\overline{K}_1K_1CI\}\overline{K}_2$$

$$0K_2 = \{SF_1K_1K_1CI + R_1\overline{K}_1K_1CI\}K_2 + RS_0$$

let $SF_1K_1K_1CI + R_1\overline{K}_1K_1CI$ be defined as $K_2CI$ $$1K_3 = \{SF_1K_2K_2CI + R_1\overline{K}_2K_2CI\}\overline{K}_3$$

$$0K_3 = \{SF_1K_2K_2CI + R_1\overline{K}_2K_2CI\}K_3 + RS_0$$

let $SF_1K_2K_2CI + R_1\overline{K}_2K_2CI$ be defined as $K_3CI$ $$1K_4 = \{SF_1K_3K_3CI + R_1\overline{K}_3K_3CI\}\overline{K}_4$$

$$0K_4 = \{SF_1K_3K_3CI + R_1\overline{K}_3K_3CI\}K_4 + RS_0$$

let $SF_1K_3K_3CI + R_1\overline{K}_3K_3CI$ be defined as $K_4CI$ $$1K_5 = \{SF_1K_4K_4CI + R_1\overline{K}_4K_4CI\}K_5$$

$$0K_5 = \{SF_1K_4K_4CI + R_1\overline{K}_4K_4CI\}\overline{K}_5 + RS_0$$

It is to be noted that gates 473, 474 and 476 inhibit the operation of the counter when both SF and $\overline{R}$ are both true at the same time. Simultaneous up and down counts do not cause the counter to change count. The general operation of this type of up-down counter is well known in the art and will not be explained in further detail.

Referring now to the table of FIG. 20, the arrangement of the decoder network 69 of FIG. 2 will be further explained. In order to indicate the total number of system elements in repair, a set of 30 yellow indicator lights are utilized. Proper illumination of these lights from the five binary counter flip flops K1 through K5 requires a decoding network similar to that indicated by the binary states of the table of FIG. 20. Thus, for example, when the flip flops K5 to K1 have a binary state 00011, yellow light numbers 2 and 1 are illuminated in response to a signal $YL_2$. Logic decoding networks of this type are well known in the art and need not be explained in further detail. Because each yellow indicator light is illuminated from light number 1 to an increasing number and is de-energized from the larger number toward yellow light number 1, the absence of a signal $YL_1$ indicates the absence of any system elements in the repair depot. Thus, the state of light number 1 provides a repair inhibit signal $R_n$ to inactivate the repair depot when no systems are being repaired as explained relative to FIG. 11.

As shown in FIG. 21, a "nand" gate 519 functioning as an "or" gate may respond to $\overline{K}_2$, $\overline{K}_3$, $\overline{K}_4$ and $\overline{K}_5$ being true to develop a $YL_1$ signal and a "nand" gate 521 may respond to flip flops K1 through K5 being in the true state to develop a $YL_{30}$ signal. The decoding of FIG. 21 is of a type well known in the art and will not be explained in further detail. The signals such as $YL_1$ and $YL_{30}$ are applied to conventional yellow light bulbs in the display panel 50 of FIG. 2.

Figure 22:
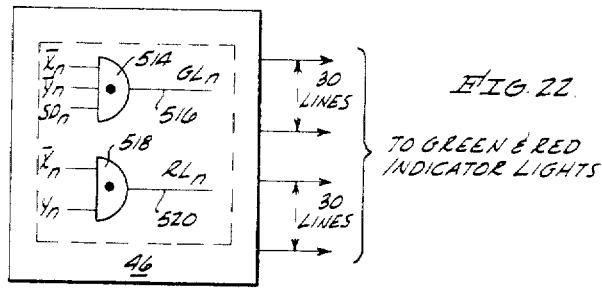
FIG. 22 is a schematic circuit diagram for further explaining the control of the yellow repair lights by the bidirectional counter in the system of FIG. 2.

Referring now to FIG. 22, the display logic 46 (FIG. 2) of the green and red indicator lights respectively representing a system in operation and a system with an undetected failure will be explained for a typical system $n$ for the green indicator light which is state one of the table of FIG. 4, both element flip flops are in the false state so that a signal $\overline{X}_n$ and $\overline{Y}_n$ in conjunction with a signal $SD_n$ showing that the system is within the selected population, energizes an "and" gate 514 to apply a signal $GL_n$ to a lead 516 which in turn energizes a green light in the display panel 50. And "and" gate 518 responds to $\overline{X}_nY_n$ representative of state two or an undetected failure to apply a signal $RL_n$ to a lead 520 to energize a red indicator light of the display panel 50. The display logic 46 of FIG. 2 includes 30 of the gating elements shown in FIG. 22, each operating in a similar manner to respond to a specific one of the 30 system elements.

Figure 23:
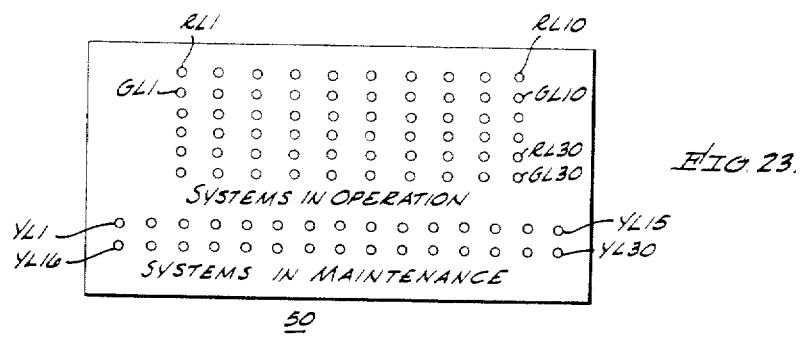
FIG. 23 is a front view of the display panel showing the arrangement of the lights in the system of FIG. 2 for monitoring and observing the solutions to statistical problems.

Referring now to the display panel of FIG. 23, the red and green indicator lights such as RL1 and GL1 are positioned adjacent to each other for readily indicating the condition of simulation system element number one. The systems in repair are queued by the yellow lights YL1 through YL30 so that the first system to be changed to the repair state will light the yellow light YL1, the second system, without an intervening repair, lights yellow light YL2 and the thirtieth system, without an intervening repair, lights yellow light YL30, with the lights being de-energized in reverse order as a system is repaired. Thus at any instant of time, the system operation may be stopped by a suitable gate in the clock 36 of FIG. 2 and the number of simulation system elements in each state counted on the panel 50 of FIG. 23.

Figure 24:
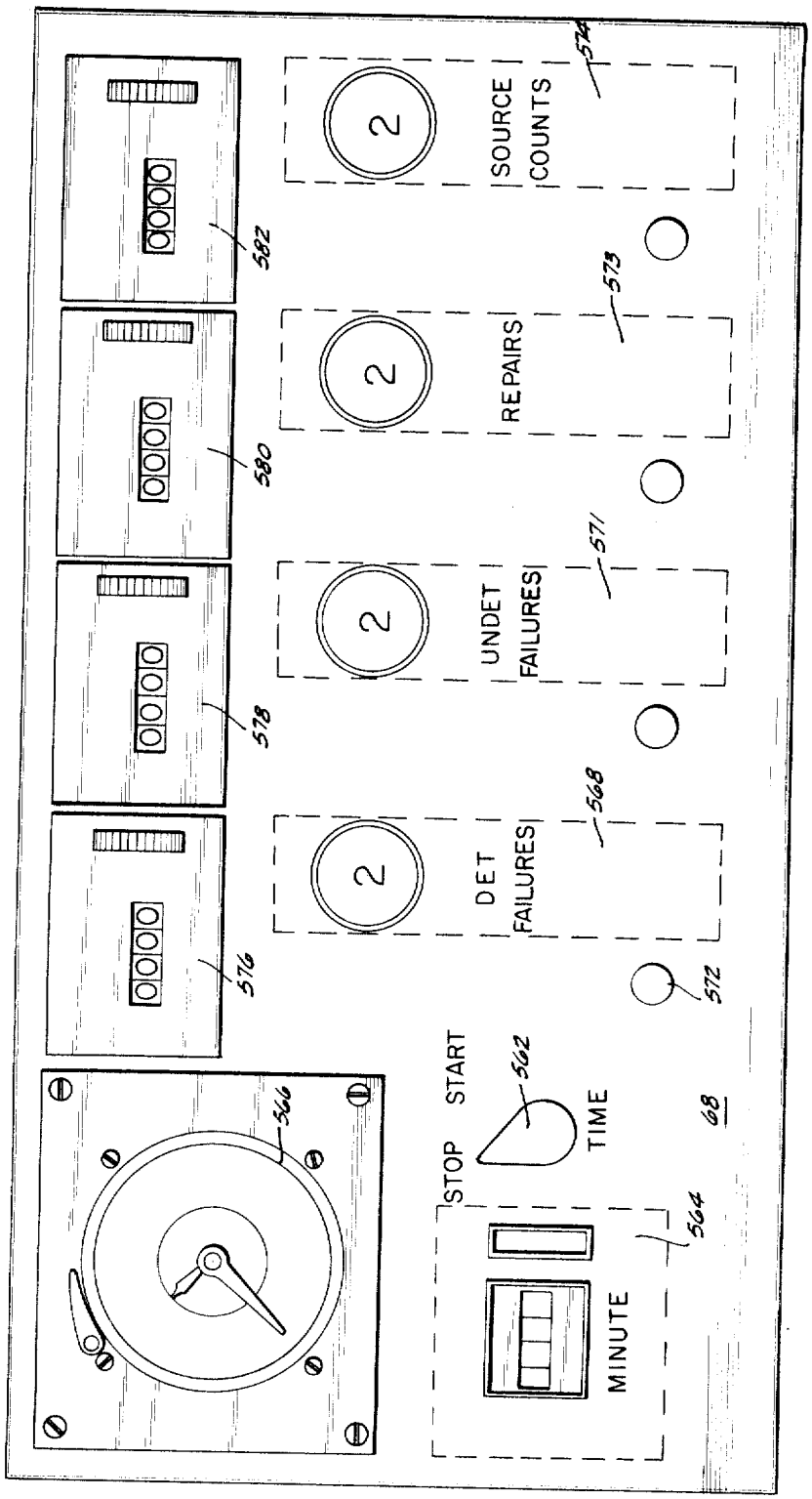
FIG. 24 is a front view of the display panel utilized in the system of FIG. 2 showing the clock and the counters for detected and undetected failure events, repair events and source counts.

Referring now to FIG. 24 which shows the event counter panel 68 of FIG. 2, the clock 36 as well as time accumulators is controlled by a suitable start-stop switch 562. The conventional time accumulators 566 and 564 are scaled in minutes and seconds. Four counters 568, 571, 573 and 574 respectfully count the display events between zero and nine for detected failures, undetected failures, repairs and source counts. Magnetic counters 576, 578, 580 and 582 respectively respond to overflow pulses from the counters 568, 571, 573 and 574. Thus, during operation, readings may be taken at any point in time during analysis of problems.

Figure 25:
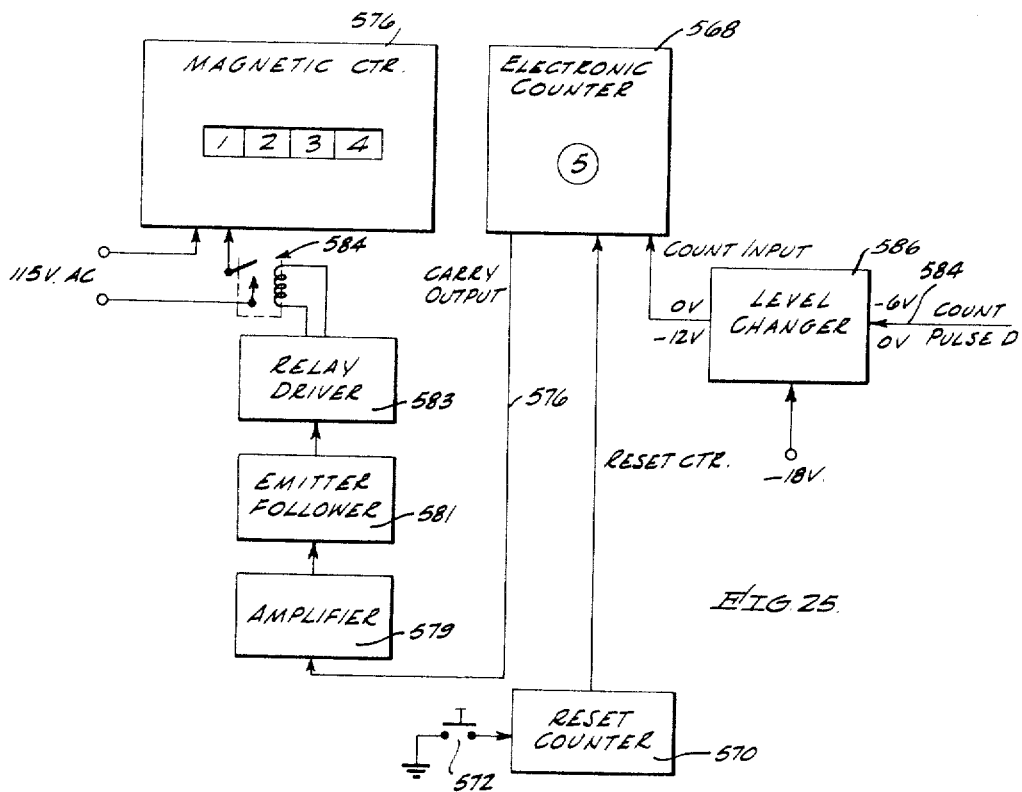
FIG. 25 is a schematic circuit and block diagram of a typical counter utilized in the display panel of FIG. 24.

Referring now also to FIG. 25, a typical electronic counter 568 and the associated magnetic counter 576 are shown in greater detail. The detected failure pulse D is applied from a lead 584 to a level changer circuit 586 which may change the pulse from —6 v. to ground with an inversion to conform with the counter 568. A reset pulse may be applied to the counter 568 from a reset pulse source 570 controlled by a switch 572. The carry output signal from the counter 568 is applied through a lead 576, an amplifier 579 and an emitter follower 581 to a relay driver 583 for energizing a relay 584 to pulse the magnetic counter 576 changing the count thereof by 10. The electronic counter 568 may be any conventional type as well known in the art such as a Burroughs DC-116 and the magnetic counter 576 may be any conventional type such as a Veeder-Root Company magnetic counter. The arrangement of this type of counter system is well known in the art and will not be explained in further detail Referring now to FIG. 26, a typical negative logic flip flop and the associated "and" gates are shown and may be generally utilized in the system in accordance with this invention. However, it is to be understood that although the simulation system has been explained generally using "nand" logic, the principles in accordance with the invention are applicable to other types of logical arrangements. The flip flop may include pnp type transistors 592 and 594 having emitters coupled to ground and suitable cross coupling between the base of one transistor and the collector of the other. The collector of the transistor 592 may also be coupled to a suitable source of biasing potential including a resistor 596 coupled to a —6 v. terminal 600. The collector of the transistor 594 is also coupled to a similar source of biasing potential. The set or true output terminal may be derived from the collector of the transistor 594 and the reset or false output terminal may be coupled to the collector of the transistor 592. The set input signal may be applied through a diode 595 of an "and" gate 601 to a lead 608 and to the base of the transistor 592 for triggering that transistor into conduction. The reset input signal may be applied through a diode 599 of an "and" gate 603 to a lead 606 and to the base of the transistor 594 for triggering that transistor into conduction with the 0 volt potential applied to the collector of the transistor 594 biasing the transistor 592 out of conduction. The gate 601 includes a diode 605 coupled between a source of clock signals and the lead 608 and the gate 603 includes a diode 607 coupled between the source signals and the lead 606. Thus, in response to a set signal changing from its normal ground level to —6 v. in coincidence with a clock pulse, the transistor 592 may be biased into conduction to apply a 0 volt signal to the reset output terminal and a —6 volt signal to the set output terminal.

Referring now to FIG. 27, a typical negative "and" circuit which may be utilized in the system in accordance with the principles of the invention may include a gate 612 having diodes 614 and 616 responsive to —6 v. levels to develop a —6 volt signal on a lead 616 coupled through a resistor 618 to a suitable source of potential such as a —18 v. terminal 620. Substantially either a zero volt or —6 volt level is maintained on the lead 616 by current flowing from either terminals 611 or 613 through a resistor 618. It is to be noted that if either leads 611 or 613 is on open circuit, the effect is the same as if a true or —6 volt signal were applied thereto. Thus, in the system of the invention, "nand" gates are utilized for inverters for uniformity of structural elements. An inverter circuit 622 included in the "nand" gate may utilize a pnp type transistor 624 having an emitter coupled to ground and a base coupled to the lead 616 as well as through the biasing resistor 626 to the +12 v. terminal 628. The collector of the transistor 624 may be coupled through a resistor 630 to a suitable source of potential such as a −6 v. terminal 632. The inverter 622 applies a 0 volt or false logical level to an output lead 634 in response to coincidence of the true −6 volt levels applied to the diodes 614 and 616, thus providing a negative "and" circuit.

Referring now to the waveforms of FIG. 28 as well as to FIGS. 6 and 9, the operation of the random pulse source 90 will be explained in further detail. A clock pulse of a waveform 700 is continuously applied to the system with the flip flops responding to the spiked pulses. A random pulse of the waveform 148 is developed by the radioactive source 90. In response to the fall of the negative pulse of the waveform 148, the monostable multivibrator 94 is triggered to develop a 21 microsecond negative pulse of a waveform 702. At the next clock pulse, the pulse of the waveform 702 triggers the flip flop A2 to the false state and the flip flop A1 to its true state to develop a negative pulse of a waveform 704 at the true output terminal of the flip flop A1. At the next clock pulse in response to the negative pulse of the waveform 704, the flip flop A2 is triggered to the true state to develop a pulse of the waveform 706 at the true output terminal thereof. Thus, the pulses of the waveforms 704 and 706 are applied to the "nand" gate 108 and the inverting "nand" gate 112 to develop a simulated failure pulse $A_1A_2$ of a waveform 708 which is applied to the lead 114. The inverse of the signal $A_1A_2$ is applied on a lead 110 to apply source count signals to the event counter 68 of FIG. 2. Thus the pulse of the waveform 708 is synchronized with the clock and eliminates the possibility of a double pulse being developed in response to the radioactive source. A similar pulse of the waveform 708 may be developed in response to a subsequent pulse of the waveform 148.

The generated failure pulse $A_1A_2$ is then applied on the lead 114 to "nand" gates 200, 202 for gating with the output of the variable duty cycle square wave generator 150. A trigger pulse SWT of the waveform 224 is applied from the pulsegenerator 152 to trigger the square wave generator 150 and develop the negative pulse SWG of the waveform 238 as well as a positive or false pulse $\overline{SWG}$ of a waveform 712. In response to the pulse of the waveform 238, the flip flop G1 is triggered to the true state as shown by a waveform 714 with its output $\overline{G}_1$ triggered to the false state as shown by the waveform 716. At the following clock pulse, the flip flop F1 is triggered to the true state in response to the pulse of the waveform 714 as shown by waveform 718, which pulse has a width representative of the period during which a detected pulse will be interpreted. Also, the flip flop F1 develops a signal $\overline{F}_1$ of a waveform 720 during the period that the signal of the waveform 718 is negative. In response to the true signal of the waveform 718 and the simulation failure pulse of the waveform 708, the "nand" gate 200 of FIG. 9, assuming the control input signals are true, responds to develop a detected failure simulated pulse $A_1A_2F_1$ of a waveform 722 which is applied to the lead 218 and to the system element 18. The undetected failure pulses during this period are not developed because the signal of the waveform 720 is false during the occurrence of the failure pulse of the waveform 708 so that the undetected failure pulse $A_1A_2\overline{F}_1$ of a waveform 726 remains at the high or false level. It is to be noted that the width and pulse SWG may be varied between 10 to 390 microseconds, for example, by controlling the square wave generator 150. The inverse signal $\overline{SWG}$ varies accordingly during an approximate 400 microsecond period of the waveform 224 fixed by the pulse generator 152 so that the system may be responsive to any desired percentage of detected and undetected pulses. A second occurrence of the pulse of the waveform 708 may develop an undetected failure pulse of the waveform 726. It is to be noted that the flip flops G1 and F1 are reset by the signal $\overline{SWG}$ going true.

The gated output signals $A_1A_2F_1$ and $A_1A_2\overline{F}_1$ are dependent upon the random frequency source for frequency of occurrence and upon the square wave generator for distinguishing between detected and undetected simulation failures.

Referring now to FIG. 29, the negative pulses of a waveform 730 represent the pulses developed by the random or radioactive pulse source 90 of FIG. 6 and the negative pulses of a waveform 732 represent the simulation failure pulses $A_1A_2$. It can be seen that the arrangement of FIG. 6 eliminates the effect of two radioactive pulses being formed substantially close together in time. It is to be noted that no significance errors are developed in the solution of a problem as a result of observing only a single pulse in each gate. The undetected simulation gate signals of waveform 734 corresponding to the signal $F_1$ is shown with a true period substantially less than the true period of the detected simulation gate signal of a waveform 736. In response to the first simulation failure pulse of the waveform 732, an undetected simulation failure pulse of a waveform 738 is developed and applied to the lead 220. In response to the second and third simulation failure pulses of the waveform 732, negative detected failure pulses of a waveform 740 are applied to the lead 218. Thus, in the illustrative arrangement shown in FIG. 9, a greater probability of detected failure pulses is provided. However, the width of the gating pulses of the waveforms 734 and 736 may be varied by controlling the square wave generator 150 to a desired width as indicated by an arrow 742. By the gating and directing of the detected and undetected pulses in the arrangement of FIG. 9, the pulses of the waveforms 738 and 740 are random with a probability as if each pulse were developed by a separate random source.

Referring now to FIG. 30 as well as to FIG. 11, the operation of the repair depot 58 will be explained in further detail. For periodic repair simulation, the repair mode switch 254 is set to state one and the relaxation oscillator 246 (FIG. 13) develops pulses of the waveform 344 at a predetermined frequency. In response to a pulse of the waveform 344, the delay multivibrator 252 is triggered to apply a pulse $R_{ot}$ of a waveform 752 through the wiper arm 296 to the lead 256. In response to a clock pulse of a waveform 787, 794 (FIG. 31) the synchronizing circuit 258 develops a repair pulse $\overline{R}$ as shown by a waveform 756.

A random repair or replacement rate is generated by the radioactive source 264 which may have an average rate of 600 counts per minute, for example. In response to an atom of the radioactive material decaying, a pulse of a waveform 758 is applied through the amplifier 266 and to the one shot multivibrator 268 to develop a negative repair pulse of a waveform 760. The oscillator 274 develops negative pulses of a waveform 762 which are applied to the square wave generator 276 which in turn applies a negative pulse $SWG_2$ similar to that of a waveform 764 to the amplifier 278. In order to vary the repair rate, the square wave generator 276 is variable so that the width of the true or negative portion of the waveform 764 is selectively variable over a wide range. Upon the occurrence of the $\lambda_2$ pulse of the waveform 760 and the $G_2$ pulse being true of the waveform 764, a $\overline{\lambda_2G_2}$ pulse of a waveform 766 is developed by the "nand" gate 284 and applied to the lead 286. Thus, because a signal is only passed through the "nand" gate 284 when the signal $G_2$ is true, varying the width thereof varies the average rate of random repair pulses applied to the lead 256. In response to the pulse of the waveform 766, the synchronizing circuit 258 develops an $\overline{R}$ repair pulse of a waveform 768 which is applied to the lead 260. It is to be noted that at the second $\lambda_2$ pulse of the waveform 760 the signal $G_2$ is false so that a repair pulse $\overline{R}$ is not developed at that time. Clock pulses of the waveform 787 show the time relation of the clock and repair pulses formed from each of the three sources.

The third mode of the repair depot 58 is probabilistic repair which provides an adjustable fixed interval with a probability of a repair event happening at the end of the interval. The repair simulation source 248 respond to the random pulse $\lambda_2 G_2$ of a waveform 780 and the variable gate signal of a waveform 782 developed by the repair source 244. The "nand" gate 290 responds to both $\lambda_2 G_2$ and the pulse $R_{ot}$ to form a pulse to trigger the flip flop P1 to the true state as shown by a waveform 784. The output signal from the flip flop P1 is applied through the switch 254 and the synchronizing circuit 258 to form a true repair signal $\bar{R}$ of a waveform 786 which is applied to the lead 260.

Referring now to FIG. 31 as well as to FIGS. 11 and 12, the synchronizing circuit 258 responds to a pulse of a waveform 788 applied to the lead 256 and to the monostable multivibrator 306. The pulse of the waveform 788 may represent a pulse of either of the three sources as shown by waveforms 752, 766 and 784 although only the trailing edge of the pulses of the waveforms 752 and 784 are utilized. The monostable multivibrator 306 responds to the failure pulse of the waveform 788 to develop a negative pulse of a waveform 790 for a predetermined period which may be 21 microseconds. In response to the pulse of the waveform 790 the flip flop B1 is triggered to the true state of a waveform 797 at the beginning of the first clock interval of a waveform 794 and the flip flop B2 is triggered to the true state as shown by a waveform 798 at the beginning of the next clock interval. The repair pulse $\bar{R}$ which is the term $\overline{B_2 B_1}$ is developed at the "nand" gate 312 by a coincidence of the signals of the waveforms 797 and 798 as shown by a waveform 800. Thus the repair pulse $\bar{R}$ is synchronized with the clock for controlling the system elements.

To further describe the overall system operation, the system failure source 20 develops random failure pulses having an average rate which may be varied by increasing the distance between the geiger tube 124 and the radioactive source 114 as shown in FIG. 7. The radioactive source develops random pulses having a Poisson distribution which are synchronized with the clock as by the arrangement shown in FIG. 6 and separated into detected and undetected failure pulses by controlling the pulse width of the square wave generator 150 of FIG. 9. During fixed repetitive intervals determined by the trigger pulses of the pulse generator 152, a selected portion of the period selects detected pulses and the remainder of the period selects undetected pulses. The effect of this operation is to provide two random pulse trains, each having a probability as if developed by a separate random source.

The elements of the system are each formed of two flip flops, the binary combinations of which form four states representing a simulated system when in operation, having an undetected failure, having a detected failure and being in the repair depot. Each system element is sequentially selected or energized by the E register to respond to a detected or undetected failure pulse as developed by the source of failure pulses. The ring counter of the E register which shifts in response to the clock which may operate at 100 kc. (kilocycles) samples each of the 30 elements once every 300 microseconds. The E register also sequentially tests each system element for the state 3 (detected failure) to initiate a system failure SF pulse which is applied to the up-down counter. As the average rate of random failure pulses may be one per second, each element is sampled for a detected failure at a rate which is normally much greater than the development of state 3 elements. The logic to develop the SF pulse may be expressed as:

$$SF = X_1 Y_1 E_1 + \ldots + X_{30} Y_{30} E_{30}$$

The up-down counter 64 of FIG. 19 maintains count of the total number of system elements that are currently in repair or state 4. The counter 64 counts up for each system failure SF pulse and count down for each repair pulse $\bar{R}$. The settings of the counter flip flops K1 through K5 are applied to the decoding network 68 to light the required number of yellow lights which simulate the total number of systems in repair.

The M register detects and repairs failed system elements. The shift register forming the M register shifts only when the system element sampled is in the operate or undetected failure states (states 1 or 2) and when all elements are in either states 1 or 2 the ring counter will cycle at a 300 microsecond rate in response to the clock pulses. When any system is in the detected failure or repair states (states 3 and 4) the ring counter stops at that element because the clock signal is prevented from being applied thereto, and holds until that particular element is repaired. The detected failure state for any element lasts a maximum of 300 microseconds and because the maximum average period between repair pulses is 100 milliseconds, any system element in the alert state 3 will be sequenced to the repair state prior to that system element being repaired. The shifting operation of the M register may be expressed as:

$$\text{SHIFT M-Register} = C(M_1 \bar{X}_1 + \ldots + M_{30} \bar{X}_{30})$$

The repair simulation depot 58 as shown in FIG. 11 includes three sources of repair pulses and a circuit 258 for synchronizing the repair pulses with the clock signals. The three sources are the fixed repair rate source 244, the random repair source 246 and the probabilistic repair source 248. In the fixed repair source 244, the relaxation oscillator 246 has a variable rate of pulses which may be selected to be every 0.1 to 10 seconds, for example. The random repair source 246 includes a radioactive source similar to that shown in FIG. 7. These random pulses are applied to the "nand" gate 284 in conjunction with pulses of variable width applied from the square wave generator 276. By varying the width of the pulses, between 3 and 95 percent of the cycle of the square wave generator, a selectable average random repair rate is provided. The probabilistic source 248 provides a geometric distribution in which a random event must happen at the end of a fixed interval, if the event does happen. For example, problems in which a number of satellites are to be maintained in orbit by replacement launchings with each satellite requiring one month to replace when failed, may be solved by using the probabilistic repair source. The random pulse is gated with the fixed repair pulse to develop a probabilistic repair pulse only at a coincidence condition. The repair mode switch 254 provides selection of the appropriate repair source. If none of the system elements are in the repair state, the pulse $R_N$ and its inverse $\bar{R}_N$ inhibits the formation of the repair pulses. The counter and light displays of the panels 68 and 50 provides a continuous indication of the results of any problem being solved.

For solving one type of problem, in accordance with the principles of the invention, the conditions may be that all systems are initially operating and it is desired to determinne the availability of the systems or the number of systems available as a function of time. The number of systems or population of operating systems is selected. The simulator is then reset so that all elements are reset with the M and E registers having a "one" inserted in the first flip flops of the ring counters. If checkout efficiency less than 100 percent is being considered, the ratio of detected to undetected failures is then set by the failure mode switch. The system has been previously calibrated to determine the mean time to failure (MTF) or the average time between failure pulses by operating the source of failure pulses and reading the counter. The MTF for a single system is equal to 30 times that for the random pulse source. For one arrangement in accordance with the invention, the MTF for each system has been determined to be 30 seconds. The type of repair source is then selected by the repair mode switch as a fixed period. The repair rate is selected as a time ratio with the average rate of failure pulses. It is to be noted that the repair source has been previously calibrated by means of an auxiliary commercial electronic instrument and the repair rate has been found to be between 0.1 pulse and 10 pulses per second. The random pulse repair source is calibrated the same way as for the failure source. The various adjustable gates are all calibrated by means of commercial timing equipment well known in the art. The random rates are substantially proportional to their repetitive gate widths. The read-out counters, clock and event counters, are then set to zero. The system is then started with the clock stop-start switch and the repair generator starts operating. The results may be observed and at any instant of time, the system stopped and a reading recorded. It is to be noted that within the principles of the invention, the conditions of the lights may be continuously recorded on a conventional moving medium recorder. For some problems, only the time is desired at which a certain number of systems have failed or have been repaired. The system of the invention allows experimental changing of the repair and failure rates to find desired repair and failure rates.

To relate the system operation to real time, any machine failure time may be selected to represent a period of real time and the repair rate related to the real time as a proportion of the failure time. For example, if the mean time to failure of a single system is 30 seconds, that period may be assumed to represent 1000 hours of real time and the repair rate is set at an average value of 3 seconds, the equivalent repair interval in real time is 100 hours.

Another general type of problem that may be readily solved with the simulator of the invention is to start the operation with all systems out of commission by operating the all systems down switch of the total system failure source 52. The total number of systems to be utilized is first selected and all systems are reset to the green condition. The repair and failure generators are turned to the off states. The all down switch is then operated to change all systems to the failure conditions and the system operation is then started similar to that above. This type of operation may show the time required for all or a certain number of the systems to change to the operate state, for example. This type operation may solve problems such as to determine the time required to have a desired number of satellites operating from the time of start of launching in which launched satellites are subject to the selected failure rates. Also, the operation may be initiated from any combinations of system states such as one half of the systems in the repair depot. Another type of simulation may require manual deployment such as in a satellite system replacement problem in which satellites are initially launched in groups of four or eight, for example. During predetermined intervals of time, the repair generator may be turned off and the system operated with only a source of failure pulses. At the ends of the periodic predetermined intervals, the selected number of systems are replaced to the operate state. Thus, planned manual operations can be introduced by controlling the failure and repair generators without resetting the machine. Simulation of this type of problem is very difficult on a conventional computer.

The simulator may be conveniently operated to demonstrate the complete behavior of the waiting queue in the classical queuing theory problem of a finite population with Poisson arrivals and exponential servicing times. With the time switch turned off the number N of systems is selected, the failure mode switch is set to "all detected" and the random repair rate is set to provide any desired value of the ratio of failure rate to repair rate $(\lambda/\mu)$. Then the time switch is turned on and after several minutes the simulation will have reached a state where the initial conditions have no residual effect. By either continuous monitoring of the yellow lights or by interrogating the time to record the state of all systems, the time history of the evolution and the distribution characteristics of the queue can be observed. The average fraction of the system in the green state is also given by the ratio of the total repair counts to the total pulse source counts multiplied by the factor $N/30$.

Thus, in accordance with the principles of the invention, there has been described a simulator system in which the time required to set up a problem is very short and in which the results may be immediately interpreted. The system has a selectively variable failure rate which has a Poisson or exponential distribution. A feature of the system is that waiting queues are developed and displayed. The repair source may be controlled to provide either a fixed, an exponential or a geometric probability distribution. Also, the average repair rates may be selectively varied.

What is claimed is:

1. A device for simulating stochastic events of a plurality of systems comprising
   a plurality of elements, each element including first and second flip flops, each element simulating a different one of the plurality of systems and having states representative of the occurrence of first events and of second events,
   a source of first event pulses random in time and coupled to said plurality of elements,
   a source of second event pulses coupled to said plurality of elements,
   and control means coupled to said plurality of elements for controlling said elements to be sequentially and repetitively energized to be responsive to the occurrence of said first event pulses and to be sequentially selected when in said state representative of the occurrence of said first event to be responsive to said second event pulses.

2. A reliability simulator system comprising
   first means including a plurality of storage elements each element including first and second flip flops for storing binary states representative of simulated conditions,
   second means for applying random failure pulses having a random occurrence in time to said first means,
   third means for applying repair pulses to said first means,
   fourth means for sequentially energizing said storage elements to respond to said failure pulses,
   fifth means for energizing said storage elements to respond to said repair pulses,
   and sixth means coupled to said second and third means for providing a count of the elements in the failed state.

3. A stochastic machine comprising
   a plurality of storage elements each having first and second states,
   a source of random first pulses coupled to said plurality of elements for changing said elements from said first to said second states,
   a source of second pulses,
   first control means coupled to said plurality of elements for sequentially energizing each element to be responsive to said first pulses,
   second control means coupled between said source of second pulses and said plurality of elements for sequentially selecting elements in said second states to be responsive to said second pulses,
   and counting means coupled to said plurality of elements and to said second control means for providing a representation of the total number of elements in said second state.

4. A system for forming waiting queues of simulated population elements comprising
   a plurality of logical elements each forming a simulated population element and each having a first state representing a non-waiting condition and a second state representing a waiting condition, a source of random first pulses being random in time and coupled to said plurality of logical elements for changing said logical elements from said first state to said second state, a source of second pulses coupled to said plurality of logical elements for changing said logical elements from said second state to said first state, first counter means coupled to said plurality of logical elements for sequentially energizing said logical elements to be responsive to said first pulses, second counter means coupled to said plurality of logical elements for sequentially selecting said logical elements in said second state to be responsive to said second pulses, and means coupled to said plurality of logical elements for providing an indication of the number of elements in said second state.

5. A device for simulating the reliability of a plurality of system elements comprising a plurality of simulating means each representing a system element and having a plurality of states, a source of random failure pulses coupled to said plurality of simulating means and including radioactive material for determining the occurrence of said random pulses, a source of selectable repair pulses of a periodic repair rate, random repair rate and probabilistic repair rate coupled to said plurality of simulating means, first ring counter means coupled to said plurality of simulating means for controlling said simulating means to respond to said failure pulses, and second ring counter means coupled to said plurality of simulating means for controlling said simulating means to respond to said repair pulses.

6. A source of synchronized random pulses of selectable average rate comprising a radioactive source mounted on a movable structure, a detector tube responsive to particles developed by the decay of atoms of said radioactive source to develop a signal, adjusting means coupled to said movable structure to vary the distance of said radioactive source from said tube, a source of clock pulses, flip flop means coupled to said detector tube and to said source of clock pulses for responding to the signals developed by said detector tube to develop random pulses in synchronism with said clock pulses, a source of gating pulses having first and second selected periods within a fixed time interval, and gating means coupled to said flip flop means and to said source of gating pulses for applying the random pulses to first and second output terminals during the respective first and second periods.

7. A device for simulating the reliability of a plurality of system elements comprising a plurality of storage means each representing a system element, and each simulating an operating condition and a failure condition, a source of random failure pulses coupled to said plurality of storage means and including radioactive material for determining the occurrence of said random pulses, a source of selectable repair pulses of a periodic repair rate, random repair rate and probabilistic periodic repair rate coupled to said plurality of storage means, first ring counter means coupled to said plurality of storage means for continuously and repetitively energizing said storage means to respond to said failure pulses to change from the operating condition to the failure condition, and second ring counter means coupled to said plurality of storage means for sequentially selecting a storage means in the failure condition to respond to a repair pulse and change to the operating condition.

8. A failure and repair simulation system comprising a plurality of memory elements each element including first and second flip flops, said first and second flip flop of each memory element having first, second, third and fourth states respectively representative of operating, undetected failure, detected failure and failure conditions, a source of random undetected failure pulses and random detected failure pulses coupled to said plurality of memory elements, said sources including a radioactive element to initiate the failure pulses, said elements responding to said undetected failure pulses to change from state one to state two and responding to said detected failure pulses to change from state one to state three, sampling means coupled to said plurality of memory elements for changing said elements from state three to state four, and a source of repair pulses coupled to said plurality of memory elements and including a selectable source of periodic pulses, random pulses and probabilistic pulses, said repair pulses changing said elements from state four to state one.

9. A system for simulating failures and repairs of units comprising a plurality of storage elements each representing a unit, each storage element including a first and second flip flop for providing first, second, third and fourth binary states respectively representing an operating condition, an undetected failure condition, a detected failure condition and a repair condition, a source of random failure pulses coupled to said plurality of storage elements for developing random detected failure pulses and random undetected failure pulses, said storage elements responding to said undetected pulses to change from said first state to said second state and responding to said detected pulses to change from said first or second states to said third state, a control source coupled to said plurality of storage elements for sequentially sampling and changing said elements from said third state to said fourth state, and a source of repair pulses coupled to said plurality of storage elements for developing repair pulses to change an element from said fourth state to said first state.

10. A machine for simulating the status of a plurality of system elements comprising a source of random failure pulses, a plurality of storage elements coupled to said source of failure pulses each storage element simulating a system element and having operate conditions and failure conditions, a source of repair pulses, first ring counter means coupled to said plurality of storage elements for sequentially energizing said elements to be responsive to said repair pulses, said first ring counter means sequentially sampling said storage elements for failure conditions, a bidirectional counter coupled to said first ring counter means and to said source of repair pulses for maintaining a count of the number of storage elements simulating failure conditions, second ring counter means coupled to said source of repair pulses and to said plurality of storage elements for sequentially sampling for a storage element in a failure condition and energizing said storage element to respond to a repair pulse, and display means coupled to said storage elements and to said bidirectional counter for providing a continuous indication of the simulated states of said storage elements.

11. A machine for simulating the status of a plurality of units comprising
- a source of random failure pulses,
- a plurality of elements coupled to said source of failure pulses each element simulating a unit and simulating operate conditions and failure conditions,
- a source of repair pulses,
- first ring counter means coupled to said plurality of elements for sequentially energizing said elements to be responsive to said repair pulses, said first ring counter means sequentially sampling said elements for failure conditions,
- a bidirectional counter coupled to said first ring counter means and to said source of repair pulses for maintaining a count of the number of elements simulating failure conditions,
- second ring counter means coupled to said source of repair pulses and to said plurality of elements for sequentially sampling for an element in a failure condition and energizing said element to respond to a repair pulse,
- first display means coupled to said plurality of elements to provide an indication of each specific element in the operate condition,
- and second display means coupled to said bidirectional counter for providing a continuous indication of the number of said elements in said failure condition.

12. A system for simulating the statistical failures and repairs of a plurality of units comprising
- a plurality of elements each representing a unit and each including a first and second flip flops coupled to have first, second, third and fourth states respectively representing a unit in operation, having an undetected failure, having a detected failure and in repair,
- a source of random pulses for developing undetected failure pulses and detected failure pulses and coupled to said plurality of elements for changing elements from said first state to said second state in response to said undetected pulses and from said first or second states to said third state in response to said detected pulses,
- a source of repair pulses coupled to said plurality of elements for changing said elements from said fourth state to said first state,
- a first control register coupled to said plurality of elements for sequentially and continuously energizing said elements to be responsive to said failure pulses,
- a second control register coupled between said source of repair pulses and said plurality of elements for selecting said elements in said fourth state for responding to said repair pulses to change to said first state,
- a bidirectional counter coupled to said first control register and to said source of repair pulses for maintaining a count of the elements in said fourth state,
- and indicating means coupled to said plurality of elements and to said bidirectional counter for providing an indication of specific ones of said elements in said first and second states and an indication of the total number of said elements in said fourth state.

13. A machine for simulating failure and repair of a plurality of units comprising:
- a plurality of elements each simulating a unit, each element including first and second flip flops together having first, second, third and fourth states respectively representative of an operating condition, an undetected failure condition, a detected failure condition and a repair condition of the simulated unit,
- a source of clock pulses coupled to said plurality of elements,
- a source of radioactive energy,
- a detector tube responsive to said radioactive energy,
- a first synchronizing circuit coupled to said first detector tube and to said source of clock pulses for forming random failure pulses,
- square wave generator means having a selected pulse width during a predetermined period,
- gating means coupled to said first square wave generator means and to said first synchronizing circuit for developing detected failure pulses during the occurrence of the pulse of said square wave generator and developing undetected failure pulses during the remainder of each of said periods,
- means coupling said first gating means to said plurality of elements,
- a first register including a first ring counter coupled to said source of clock pulses and to said plurality of elements for sequentially and periodically energizing said elements to respond to said detected and undetected failure pulses and to change from said detected failure condition to said repair condition, said first register including logical means coupled to said elements and to said first ring counter for sampling said elements and developing a failure pulse when one of said elements is in a detected failure condition,
- a source of periodic repair pulses,
- a source of random repair pulses,
- a source of probabilistic repair pulses coupled to said sources of periodic repair pulses and random repair pulses for providing a repair pulse at periodic intervals in response to a random repair pulse,
- repair mode switching means coupled to said sources of periodic repair pulses, random repair pulses and probabilistic repair pulses,
- a second synchronizing circuit coupled to said repair mode switching means and to said source of clock pulses,
- a second register coupled to said second synchronizing circuit, to said source of clock pulses and to said plurality of elements for sequentially selecting said elements in the repair condition to be responsive to said repair pulses and change to said operating condition,
- bidirectional counter means coupled to said second synchronizing circuit and to said first register for counting in a first direction in response to a failure pulse and counting in a second direction in response to a repair pulse,
- first display means coupled to said bidirectional counter for maintaining an indication of the number of elements in the repair condition,
- and second display means coupled to said plurality of elements for providing an indication of each element in the operating or undetected failure conditions.

No references cited.

MALCOLM A. MORRISON, *Primary Examiner.*

I. FAIBISCH, V. SIBER, *Assistant Examiners.*

UNITED STATES PATENT OFFICE
CERTIFICATE OF CORRECTION

Patent No. 3,377,471                                    April 9, 1968

Edward J. Althaus et al.

It is certified that error appears in the above identified patent and that said Letters Patent are hereby corrected as shown below:

Column 1, line 46, "computer" should read -- computed --; line 59, cancel "or of a desired type of random occurrence". Column 5, line 13, "repair rate having a geometric distribution which de-" should read -- repair rate having a geometric distribution. A geometric distribution which de- --. Column 10, line 55, "from-" should read -- form- --. Column 12, line 25, "to 110" should read -- to 10 --. Column 15, lines 39 and 40, "typical system n for the green" should read -- typical system n. For the green --. Column 16, line 52, after "source" insert -- of clock --. Column 18, line 13, "significance" should read -- significant --. Column 20, line 25, after "$+M_{30}\bar{X}_{30}$" insert a closing parenthesis.

Signed and sealed this 16th day of December 1969.

(SEAL)
Attest:

EDWARD M. FLETCHER, JR.                        WILLIAM E. SCHUYLER, JR.
Attesting Officer                                       Commissioner of Patents